United States Patent
Shimada et al.

(10) Patent No.: US 7,812,575 B2
(45) Date of Patent: Oct. 12, 2010

(54) BIDIRECTIONAL DC-DC CONVERTER AND POWER SUPPLY APPARATUS WITH THE SAME

(75) Inventors: Takae Shimada, Hitachi (JP); Hiroyuki Shoji, Hitachi (JP); Masahiro Hamaogi, Odawara (JP); Kimiaki Taniguchi, Nakai (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 512 days.

(21) Appl. No.: 11/698,867

(22) Filed: Jan. 29, 2007

(65) Prior Publication Data

US 2008/0309301 A1  Dec. 18, 2008

(30) Foreign Application Priority Data

Apr. 14, 2006 (JP) .............................. 2006-111842

(51) Int. Cl.
G05F 1/00 (2006.01)
(52) U.S. Cl. .................. 323/222; 323/232; 323/271; 323/282
(58) Field of Classification Search ................. 323/223, 323/225, 232, 234, 259, 271, 222, 282; 363/22, 363/24
See application file for complete search history.

(56) References Cited

U.S. PATENT DOCUMENTS 6,081,434 A * 6/2000 Kinoshita et al. ............. 363/24
7,239,114 B2 * 7/2007 Durbaum et al. ............. 323/224
2002/0113581 A1 * 8/2002 Eagar et al. .................. 323/282
2002/0185993 A1 * 12/2002 Qian .......................... 323/282
2007/0216319 A1 * 9/2007 Wai et al. .................... 315/247
2008/0196950 A1 * 8/2008 Stancu et al. ............... 180/65.1

FOREIGN PATENT DOCUMENTS

| JP | 2001-037214 | 2/2001 |
| JP | 2003-033013 | 1/2003 |
| JP | 2003-153527 | 5/2003 |
| JP | 2003-189602 | 7/2003 |
| JP | 2004-201373 | 7/2004 |
| JP | 2004-343923 | 12/2004 |
| JP | 2005-176540 | 6/2005 |
| JP | 2005-184965 | 7/2005 |

* cited by examiner

*Primary Examiner*—Bao Q Vu
*Assistant Examiner*—Nguyen Tran
(74) *Attorney, Agent, or Firm*—Antonelli, Terry, Stout & Kraus, LLP.

(57) ABSTRACT

A bidirectional DC-DC converter 10 has smoothing capacitors Cs1 and Cs2, a smoothing reactor Ls, resonant reactors Lr1 and Lr2, and a resonant capacitor Cr, as well as insulated gate bipolar transistors (IGBTs) Q1, Q2, and Q3 to which buffer capacitors C1, C2, and C3 are connected in parallel and diodes D1, D2, and D3 are connected in a back-to-back configuration. After part of the energy stored in the smoothing reactor Ls and/or resonant reactors Lr1 and Lr2 draws charges in the buffer capacitor C3 and is stored in the resonant capacitor Cr, the energy is stored in the resonant reactors Lr1 and Lr2. The energy is used to draw charges in the buffer capacitors C1 and C2, achieving soft switching of IGBTs Q1, Q2, and Q3.

20 Claims, 34 Drawing Sheets

BIDIRECTIONAL DC-DC CONVERTER AND POWER SUPPLY APPARATUS WITH THE SAME

CLAIM OF PRIORITY

The present application claims priority from Japanese application serial no. 2006-111842, filed on Apr. 14, 2006, the content of which is hereby incorporated by reference into this application.

FIELD OF THE INVENTION

The present invention relates to a bidirectional DC-DC converter having a soft switching function and to a power supply apparatus with the bidirectional DC-DC converter.

BACKGROUND OF THE INVENTION

Hybrid vehicles with high efficiency have recently become widespread in response to a growing concern about global environmental conservation. The efficiency of a hybrid vehicle is increased by storing energy in an electricity storage unit and using the stored energy as necessary. A bidirectional DC-DC converter is used to control the charging and discharging of the electricity storage unit.

In conventional bidirectional DC-DC converters, hard switching is dominant in which a switchover is made while a voltage is applied to a switching device or current is flowing in it. The action by which a switching device is turned on from the turned-off state or turned off from the turned-on state is called switching. The efficiency of hard switching is low because the energy loss involved in switching is large.

A resonant bidirectional DC-DC converter that reduces the loss involved in switching to increase the efficiency is disclosed in Japanese Patent Laid-open No. 2003-33013 (Patent Document 1). This resonant bidirectional DC-DC converter performs boost and buck operations between 12-V and 42-V power supplies, so a pair of main metal oxide semiconductor field effect transistors (MOSFETs) and a main smoothing reactor are used as a basic main circuit. In addition to this basic main circuit, a pair of auxiliary MOSFETs and a resonant reactor are used as an auxiliary resonant circuit so as to implement soft switching. The pair of main MOSFETs are connected in series between both buses of a second power supply. An auxiliary smoothing reactor is connected between the series connection points and the positive bus of a first power supply. A snubber (buffer) capacitor is connected in parallel to each of the pair of main MOSFETs. The auxiliary resonant circuit is connected between both ends of the main reactor; the auxiliary resonant circuit comprises a pair of anti-series auxiliary MOSFETs and a series auxiliary (resonant) reactor.

The auxiliary resonant circuit controls the switching of the auxiliary MOSFET pair in both the boost and buck operations so that the charging and discharging of the snubber capacitors connected to the main MOSFETs are controlled by resonant current flowing in the resonant reactor, thereby achieving soft switching.

A resonant bidirectional DC-DC converter is disclosed in Japanese Patent Laid-open No. 2005-176540 (Patent Document 2), in which four main transistors are connected in a bridge form, a main rector is connected among their bridging points, and an auxiliary resonant circuit is connected in parallel to the main reactor. This auxiliary resonant circuit also comprises a pair of anti-series auxiliary transistors and a series auxiliary (resonant) reactor as in (Patent Document 1).

In Japanese Patent Laid-open No. 2005-184965 (Patent Document 3), a bidirectional DC-DC converter using many devices is disclosed.

Japanese Patent Laid-open No. 2004-343923 (Patent Documents 4), 2001-37214 (Patent Documents 5), 2003-153527 (Patent Documents 6), 2003-189602 (Patent Documents 7), and 2004-201373 (Patent Documents 8) disclose technologies for increasing the efficiency of a unidirectional DC-DC converter by reducing a switching loss.

SUMMARY OF THE INVENTION

The conventional resonant bidirectional DC-DC converters disclosed in Patent Documents 1 and 2 use a reactor with a large current rating as the main (smoothing) reactor, resulting in an increase in size and weight. This is because the main reactor with a large current rating is needed to allow current to flow into the auxiliary reactor in the direction opposite to the direction in which current flows in the main reactor so that charges stored in the snubber capacitors connected to main switching devices can be drawn.

A pair of auxiliary switching devices are also needed to achieve soft switching of the main switching devices. An increase in the number of switching devices makes the structure complex and raises the cost.

Just complementary switching is insufficient in control of the main switching devices and auxiliary switching devices; timing is also important, resulting in complexity in control. From the viewpoint of this, the complex structure and increased cost cannot be avoided.

In addition, the auxiliary switching devices are turned on based on zero-current switching (ZCS), generating a switching loss larger than in zero-voltage switching (ZVS).

The technology disclosed in Patent Document 3 also uses many devices, and an increase in the number of devices makes the structure complex and raises the cost.

As described above, the conventional bidirectional DC-DC converters are problematic in that they have many factors that sacrifice their sizes, weights, and costs in order to achieve soft switching of the main switching devices.

An object of the present invention is to provide a bidirectional DC-DC converter that uses a reactor with a relative small current rating as the smoothing reactor to achieve soft switching.

Another object of the present invention is to provide a bidirectional DC-DC converter that achieves soft switching with a relatively small number of switching devices.

A yet another object of the present invention is to provide a bidirectional DC-DC converter that achieves soft switching by performing relatively simple switching control for the switching devices.

A still another object of the present invention is to provide a bidirectional DC-DC converter that achieves zero-voltage switching (ZVS) even when the auxiliary switching device is turned on and off.

In a bidirectional DC-DC converter having a first smoothing capacitor connected in parallel to a first power supply, a second smoothing capacitor connected in parallel to a second power supply, first and second switching devices, a smoothing reactor, and a control means for repeatedly storing energy in and releasing energy from the smoothing reactor and turning on and off the first and second switching devices so that electric power is transferred and received between the first and second smoothing capacitors, the bidirectional DC-DC converter in one aspect of the present invention comprises a resonant reactor, a storage circuit for storing part of the energy released from the smoothing reactor and/or resonant reactor in a period in which the smoothing reactor releases the energy it stored, and a third switching device by which part of the energy stored in the storage circuit is released into the resonant reactor; the control means uses the energy stored in the resonant reactor to turn on and off the first to third switching devices so that charges stored in buffer capacitors for the first and second switching devices are drawn immediately before the first and second switching devices are turned on.

In a preferred mode of the present invention, the resonant reactor stores energy by using current for storing energy in and/or releasing energy from the smoothing reactor; the energy stored in the resonant reactor and/or the energy of the smoothing reactor is transferred to a capacitor in the storage circuit; the energy stored in the capacitor is stored in the resonant reactor through the third switching device; the energy stored in the resonant reactor is used to draw charges stored in the snubber (buffer) capacitors (or output capacitors) of the first and second switching devices.

According to a preferred mode of the present invention, current flowing in the smoothing reactor may be nearly equal to current in the case in which soft switching is not used, so a bidirectional DC-DC converter can be provided that uses a reactor with a relative small current rating as the smoothing reactor to achieve soft switching.

According to another preferred mode of the present invention, a bidirectional DC-DC converter can be provided that achieve soft switching with a relatively small number of switching devices.

According to yet another preferred mode of the present invention, a bidirectional DC-DC converter can be provided that achieves soft switching by relatively simple switching control of main (first and second) switching devices and an auxiliary (third) switching device.

According to still another preferred mode of the present invention, a bidirectional DC-DC converter can be provided that can achieve zero-voltage switching (ZVS) even when the auxiliary (third) switching device is turned on and off.

Other objects and features of the present invention will be clarified in embodiments given below.

DESCRIPTION OF THE PREFERRED EMBODIMENTS

Figure 1:
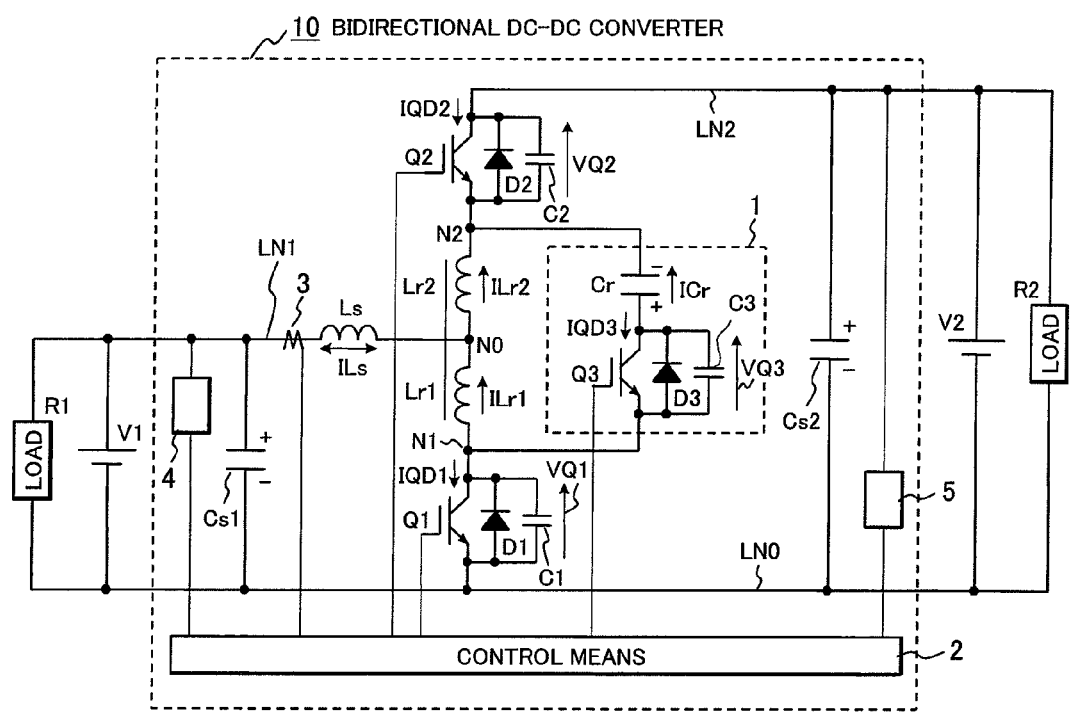
FIG. 1 is the circuit configuration of a bidirectional DC-DC converter according to a first embodiment of the present invention.

Embodiments of the present invention will be described in detail with reference to the drawings. The same or equivalent elements in the drawings are assigned the same reference numerals to eliminate duplicate description. In the description below, an insulated gate bipolar transistor (IGBT) is used as an exemplary switching device, and a voltage nearly equal to or below the forward drop voltage of a switching device or diode in the on state will be referred to as the zero voltage.

First Embodiment

FIG. 1 is the circuit configuration of a bidirectional DC-DC converter according to a first embodiment of the present invention. The bidirectional DC-DC converter 10 has first and second switching devices (IGBTs) Q1 and Q2 as well as a third switching device (IGBT) Q3; the switching of these switching devices is controlled by a control means 2. The control means 2 receives outputs of a current sensor 3 and voltage sensors 4 and 5. Other circuit elements are smoothing capacitors Cs1 and Cs2, a smoothing reactor Ls, resonant reactors Lr1 and Lr2, a resonant capacitor Cr, diodes D1 to D3, and buffer capacitors C1 to C3.

The bidirectional DC-DC converter 10 is connected between a power supply V1 and another power supply V2, the voltage of which is higher than the voltage of power supply V1, and performs voltage conversion between power supply V1 and power supply V2. A load R1 is connected to power supply V1, and another load R2 is connected to power supply V2.

Smoothing capacitor Cs1 is connected between a negative bus LN0 and a positive bus LN1 of power supply V1, and resonant capacitor Cs2 is connected between negative bus LN0 and a positive bus LN2 of power supply V2. The emitter of IGBT Q1 is connected to negative bus LN0, and the collector of IGBT Q2 is connected to positive bus LN2. One end of the smoothing reactor Ls is connected to positive bus LN1, and the other end of the smoothing reactor Ls is connected to a node N0.

Resonant reactor Lr1 is connected between the collector of IGBT Q1 and node N0, and resonant reactor Lr2 is connected between the emitter of IGBT Q2 and node N0. These resonant reactors Lr1 and Lr2 are magnetically coupled to use the same core, thereby increasing the usage efficiency of the core and making the core compact. The point at which IGBT Q1 and resonant reactor Lr1 are interconnected is called a node N1, and the point at which IGBT Q2 and resonant reactor Lr2 are interconnected is called a node N2.

IBGT Q3 is connected in series to the resonant capacitor Cr to form an active resonant circuit. Another active resonant circuit is formed between node N1 and node N2 in such a way that the emitter of IGBT Q3 faces node N1.

Diodes D1 to D3 are connected between the collectors and emitters of IGBTs Q1 to Q3, respectively, so that current flows from the emitter to the collector. Buffer capacitors C1 to C3 are connected between the collectors and emitters of IGBTs Q1 to Q3, respectively.

Symbols representing voltages and currents in the circuit diagram in FIG. 1 will be defined before operation is described in detail. Voltages VQ1 to VQ3 between the collectors and emitters of IGBTs Q1 to Q3 are positive on the collector side. Composite currents flowing in IGBTs Q1 to Q3 and in diodes D1 to D3 respectively connected in parallel to IGBTs Q1 to Q3 are positive when they flow from the collectors to the emitters in IGBTs Q1 to Q3; the composite currents are denoted IQD1 to IQD3.

The direction of current ILs flowing into the smoothing reactor Ls is defined as follows: in a boost operation in which energy is sent from power supply V1 to power supply V2, the current is positive when it flows from positive bus LN1 to node N0; in a buck operation in which energy is sent from power supply V2 to power supply V1, the current is positive when it flows from node N0 to positive bus LN1. Current ILr1 flowing into resonant reactor Lr1 is positive when it flows from node N1 to node N0. Current ILr2 flowing into resonant reactor Lr2 is positive when it flows from node N0 to node N2.

Current ICr flowing into the resonant capacitor Cr is positive when it flows in the direction in which forward current flows in diode D3.

(From V1 to V2: Boost Operation)

Figure 2A:
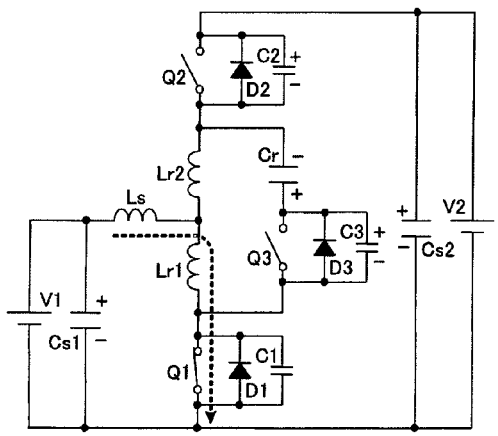
FIGS. 2A to 2F are circuit diagrams, each of which illustrates a boost operation of the bidirectional DC-DC converter in the first embodiment of the present invention.
Figure 2B:
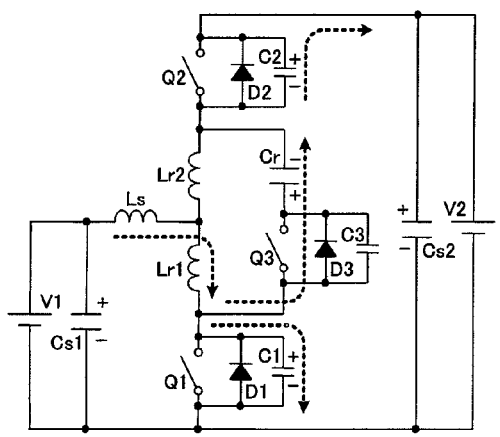
Figure 2C:
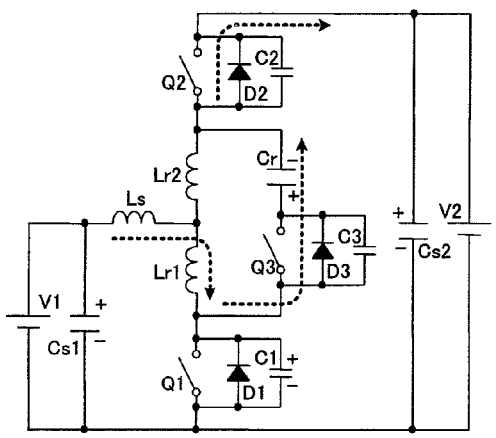
Figure 2D:
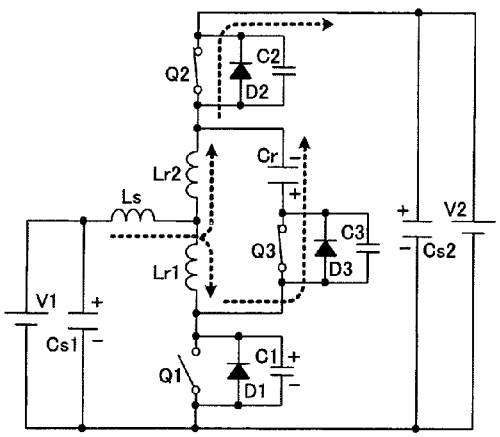
Figure 2E:
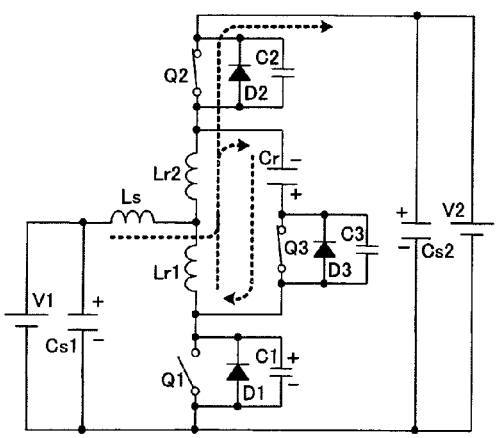
Figure 2F:
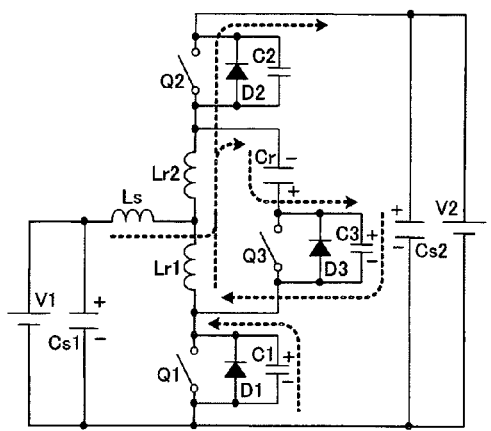
Figure 3G:
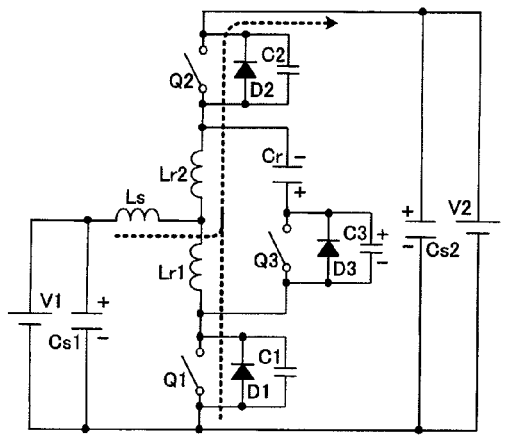
FIGS. 3G to 3L are also circuit diagrams, each of which illustrates a boost operation of the bidirectional DC-DC converter in the first embodiment of the present invention.
Figure 3J:
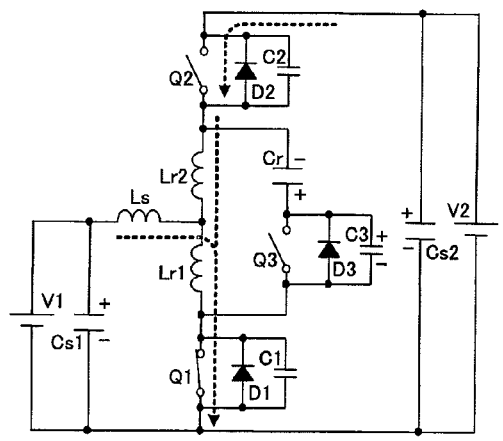
Figure 3H:
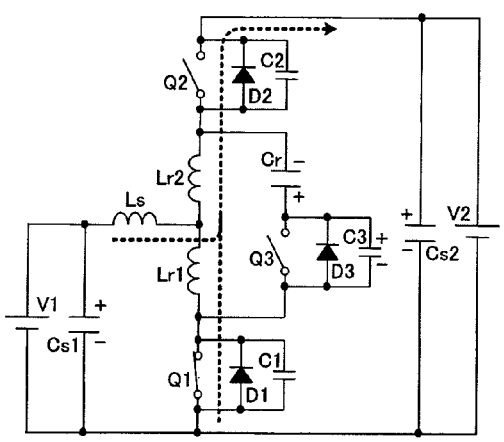
Figure 3K:
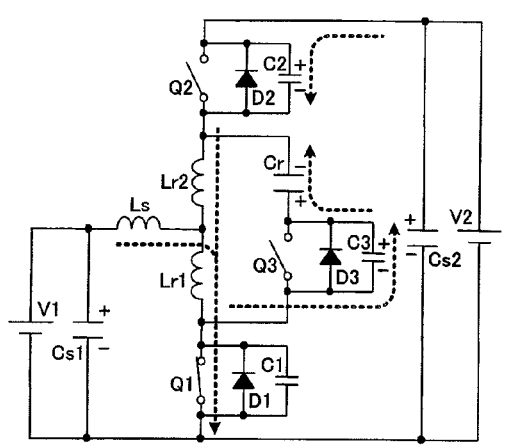
Figure 3I:
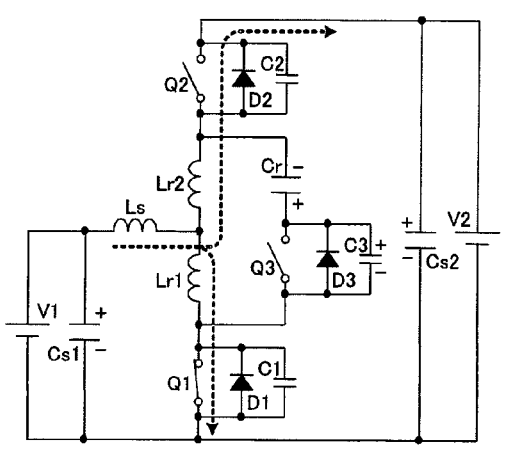
Figure 3L:
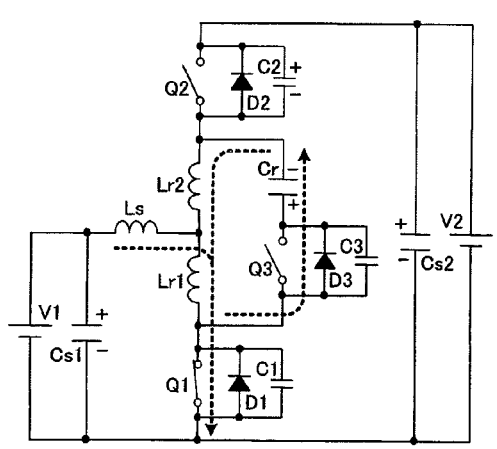
Figure 4:
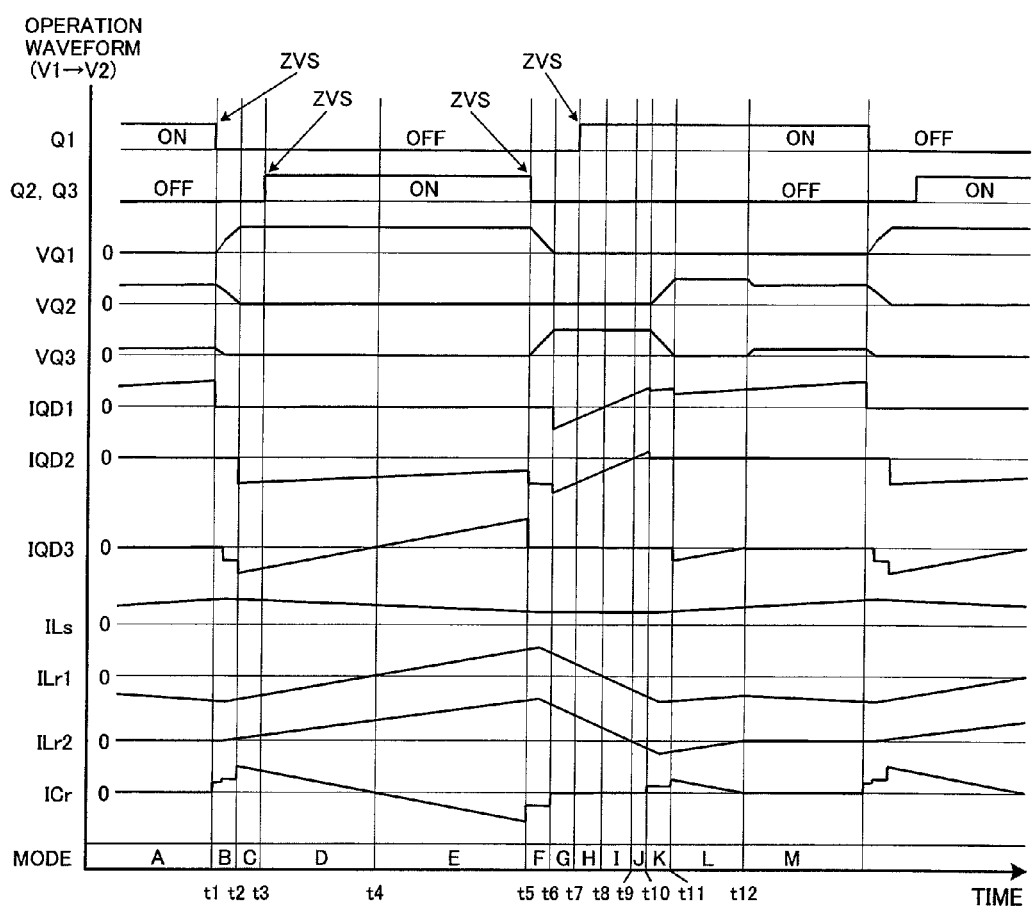
FIG. 4 shows voltage and current waveforms for illustrating the boost operation of the bidirectional DC-DC converter in the first embodiment of the present invention.

FIGS. 2A to 2F and FIGS. 3G to 3L are circuit diagrams, each of which illustrates a boost operation in the first embodiment of the present invention. FIG. 4 shows voltage and current waveforms for illustrating the boost operation in the first embodiment of the present invention.

The boost operation in the first embodiment of the present invention will be described in detail with reference to FIGS. 2A to 2F, FIGS. 3G to 3L, and FIG. 4. In the description below, the boost operation is defined as the operation to transfer energy in power supply V1 to power supply V2. FIGS. 2A to 2F and FIGS. 3G to 3L correspond to modes A to L in FIG. 4.

(Mode A)

In mode A, IGBT Q1 is in the on state, and IGBTs Q2 and Q3 are in the off state. The current ILs in the smoothing reactor Ls gradually increases, the value of current ILr1 of resonant reactor Lr1 gradually increases in the negative direction, and the energy in power supply V1 is stored in the smoothing reactor Ls and resonant reactor Lr1. Buffer capacitors C2 and C3 and the resonant capacitor Cr are charged with the polarity shown in FIG. 2A at this time.

(Mode B)

IBGT Q1 is then turned off at time t1. Voltage VQ1 at buffer capacitor C1 connected in parallel to IGBT Q1 gradually increases from zero at this time. Therefore, IGBT Q1 undergoes zero-voltage switching at time t1. As voltage VQ1 increases, the voltage between the collector of IGBT Q2 and the collector of IGBT Q1 decreases. However, currents ILr1 and ILr2 in the resonant reactors Lr1 and Lr2 do not change rapidly with time. Buffer capacitors C2 and C3 release their stored charges, causing voltages VQ2 and VQ3 to drop. When VQ3 reaches a voltage of 0 V, diode D3 is turned on. FIG. 2B shows the state of the circuit at that time. Specifically, the current ILs passing through the smoothing reactor Ls is divided into two paths; after passing through resonant reactor Lr1, the current is divided into current that flows into buffer capacitor C1 and current that flows into buffer capacitor C3 (diode D3 when voltage VQ3 is 0 V), resonant capacitor Cr, and then buffer capacitor C2. From another viewpoint, resonant reactors Lr1 and Lr2 function so that the current ILs in the smoothing reactor Ls flows into the resonant capacitor Cr.

(Mode C)

When voltage VQ2 then reaches a voltage of 0 V at time t2, diode D2 is turned on, bringing the state in mode C. The current ILs flowing in the smoothing reactor Ls flows into resonant reactor Lr1, diode D3, the resonant capacitor Cr, and diode D2. The voltage of the resonant capacitor Cr is applied to the series circuit comprising resonant reactors Lr1 and Lr2, causing currents ILr1 and ILr2 to change with time in the positive direction. Specifically, part of the current ILs flowing in the smoothing reactor Ls flows into resonant reactor Lr2 and is then combined with the current that has passed through the resonant capacitor Cr; the resulting current flows into diode D2. At this time, the power supply V1's energy stored in the smoothing reactor Ls is supplied to power supply V2, and the current ILs gradually decreases. Part of the energy stored in the smoothing reactor Ls and resonant reactor Lr1 is stored in the resonant capacitor Cr.

(Mode D)

IGBTs Q2 and Q3 are then turned on at time t3. Incidentally, IGBT Q2 may not be turned on. IGBT Q2 may be left turned on or off in a period from time t3 to time t9 described below. Since voltages VQ2 and VQ3 are zero at time t3, IGBTs Q2 and Q3 undergo zero-voltage switching, bringing the state in mode D. Current ILs flowing in the smoothing reactor Ls is divided into current that flows into resonant reactor Lr1 and current that flows into resonant reactor Lr2. Current ILr1 flowing in resonant reactor Lr1 flows into diode D3 and resonant capacitor Cr and is then combined with current ILr2 that has passed through resonant reactor Lr2; the resulting current flows into diode D2. Currents ILr1 and ILr2 change with time in the positive direction, as in mode C, so the value of current ILr1 decreases and current ILr2 increases. At this time, the power supply V1's energy stored in the smoothing reactor Ls is supplied to power supply V2, and the current ILs gradually decreases. Part of the energy stored in the smoothing reactor Ls and resonant reactor Lr1 is stored in the resonant capacitor Cr.

(Mode E)

Current ILr1 then changes from negative to positive at time t4, bringing the state in mode E. The current ILs flowing in the smoothing reactor Ls flows into resonant reactor Lr2 and diode D2, the power supply V1's energy stored in the smoothing reactor Ls is supplied to power supply V2, and the current ILs gradually decreases. Since IGBT Q3 is in the on state, the voltage in the resonant capacitor Cr continues to be applied to the series circuit comprising resonant reactors Lr1 and Lr2. The resonant capacitor Cr releases charges in a path extending through IGBT Q3, resonant reactor Lr1, resonant reactor Lr2, and the resonant capacitor Cr in that order; the energy in the resonant capacitor Cr is stored in resonant reactors Lr1 and Lr2.

(Mode F)

IGBTs Q2 and Q3 are then turned off at time t5, bringing the state in mode F. IGBT Q2 may be tuned off before time t9 described below arrives. Voltage VQ3 at buffer capacitor C3 connected in parallel to IGBT Q3 gradually increases from zero at this time. Therefore, IGBT Q3 undergoes zero-voltage switching at time t5. Since voltage VQ1 decreases as voltage VQ3 increases, buffer capacitor C1 releases its stored charges. Currents ILr1 and ILr2 in the resonant reactors Lr1 and Lr2 do not change rapidly with time. Accordingly, the discharge current in the buffer capacitor C1 decreases the discharge current in the resonant capacitor Cr and increases the conducting current of diode D2. The current ILs flowing in the smoothing reactor Ls continues to flow into resonant reactor Lr2 and diode D2, the power supply V1's energy stored in the smoothing reactor Ls is supplied to power supply V2, and the current ILs gradually decreases.

(Mode G)

When voltage VQ1 then reaches a voltage of 0 V at time t6, diode D1 is turned on, bringing the state in mode G. The charging of buffer capacitor C3 is completed, and the current that has flowed in the resonant capacitor Cr in mode F flows into diode D2. The current flowing in diode D1 passes through resonant reactor Lr1 and is then combined with the current ILs that has passed through the smoothing reactor Ls; the resulting current flows into resonant reactor Lr2 and diode D2. The voltage of power supply V2 is applied to the series circuit comprising resonant reactors Lr1 and Lr2, the energy stored in the resonant reactors Lr1 and Lr2 is supplied to power supply V2, and currents ILr1 and ILr2 gradually decrease. The conducting currents in diodes D1 and D2 also decrease accordingly.

(Mode H)

IGBT Q1 is then turned on at time t7. Since voltage VQ1 at time t7 is 0 V, IGBT Q1 undergoes zero-voltage switching, bringing the state in mode H. The state of the circuit is the same as in mode G, as shown in FIGS. 3G and 3H; the energy stored in the resonant reactors Lr1 and Lr2 is supplied to power supply V2, and currents ILr1 and ILr2 and the conducting currents in diodes D1 and D2 gradually decrease.

(Mode I)

Current ILr1 then changes from positive to negative at time t8, bringing the state in mode I. Since IGBT Q1 is in the on state, the voltage of power supply V2 continues to be applied to the series circuit comprising resonant reactors Lr1 and Lr2; the value of current ILr1 increases in the negative direction and current ILr2 decreases. Accordingly, current ILs flowing in the smoothing reactor Ls is divided into current that flows into resonant reactor Lr2 and then diode D2 and current that flows into resonant reactor Lr1 and then IGBT Q1. If IGBT Q2 is in the on state, it is tuned off before the period of mode I expires.

(Mode J)

Current ILr2 then changes from positive to negative at time t9, bringing the state in mode J. IGBT Q2 is in the off state. The J mode assures a period (reverse recovery time) required by diode D2 to change (reversely recover) from the on state to the off state. The voltage of power supply V2 continues to be applied to the series circuit comprising resonant reactors Lr1 and Lr2; the values of currents ILr1 and ILr2 increase in the negative direction. The reverse current in diode D2 flows into resonant reactor Lr2 and is then combined with the current ILs that has passed through the smoothing reactor Ls; the resulting current passes through resonant reactor Lr1 and flows into IGBT Q1.

(Mode K)

Diode D2 reversely recovers at time t10, bringing the state in mode K. Voltage VQ2 at buffer capacitor C2 connected in parallel to IGBT Q2 gradually increases from zero at this time. Since voltage VQ3 decreases as voltage VQ2 increases, buffer capacitor C3 releases its stored charges. The discharge current of buffer capacitor C3 passes through the resonant capacitor Cr and is then combined with the current that has charged buffer capacitor C2; the resulting current flows into resonant reactor Lr2 and is then combined with the current ILs that has passed through the smoothing reactor Ls; the resulting current flows into resonant reactor Lr1. Currents ILr1 and ILr2 in the resonant reactors Lr1 and Lr2 do not change rapidly with time. Accordingly, the discharge current in the buffer capacitor C3 decreases the current in IGBT Q1.

(Mode L)

When voltage VQ3 then reaches a voltage of 0 V at time t11, diode D3 is turned on, bringing the state in mode L. The charging of buffer capacitor C2 from power supply V2 is completed, reducing the current in IGBT Q1. Since currents ILr1 and ILr2 in the resonant reactors Lr1 and Lr2 do not change rapidly with time, the current for charging the resonant capacitor Cr increases. The power supply V1's energy is stored in the smoothing reactor Ls, and the current ILs gradually increases. The voltage of the resonant capacitor Cr is applied to the series circuit comprising resonant reactors Lr1 and Lr2, and currents ILr1 and ILr2 change with time in the positive direction. The energy stored in resonant reactors Lr1 and Lr2 is stored in the resonant capacitor Cr. The energy stored in resonant reactors Lr1 and Lr2 within the reserve recovery time of diode D2 can be thus recovered in the resonant capacitor Cr without causing a surge.

When the current in resonant reactor Lr2 then reaches zero at time t12, the state in mode A is brought again. Resonant current flows in resonant reactors Lr1 and Lr2, the resonant capacitor Cr, and buffer capacitor C3 at this time, which may cause waveforms to fluctuate.

(From V2 to V1: Buck Operation)

FIGS. 5A to 5F and FIGS. 6G to 6L are circuit diagrams, each of which illustrates a buck operation in the first embodiment of the present invention. FIG. 7 shows voltage and current waveforms for illustrating the buck operation in the first embodiment of the present invention.

The buck operation in the first embodiment of the present invention will be described in detail with reference to FIGS. 5A to 5F, FIGS. 6G to 6L, and FIG. 7. In the description below, the buck operation is defined as the operation to transfer energy in power supply V2 to power supply V1. FIGS. 5A to 5F and FIGS. 6G to 6L correspond to modes A to L in FIG. 7.

(Mode A)

In mode A, IGBT Q2 is in the on state, and IGBTs Q1 and Q3 are in the off state. Current ILs in the smoothing reactor Ls gradually increases, the value of current ILr2 of resonant reactor Lr2 gradually increases in the negative direction, and the energy in power supply V2 is stored in the smoothing reactor Ls and resonant reactor Lr2. Buffer capacitors C1 and C3 and the resonant capacitor Cr are charged with the polarity shown in FIG. 5A at this time.

(Mode B)

Figure 5A:
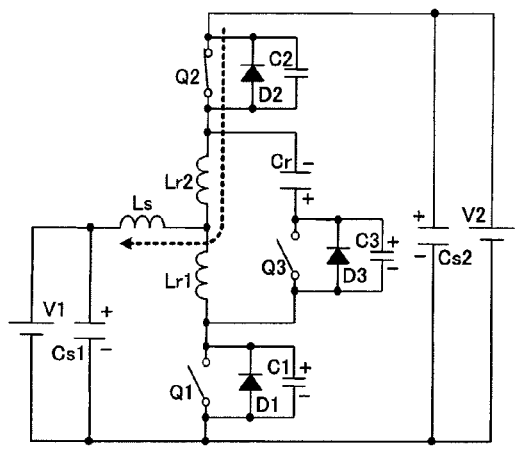
FIGS. 5A to 5F are circuit diagrams, each of which illustrates a buck operation of the bidirectional DC-DC converter in the first embodiment of the present invention.
Figure 5D:
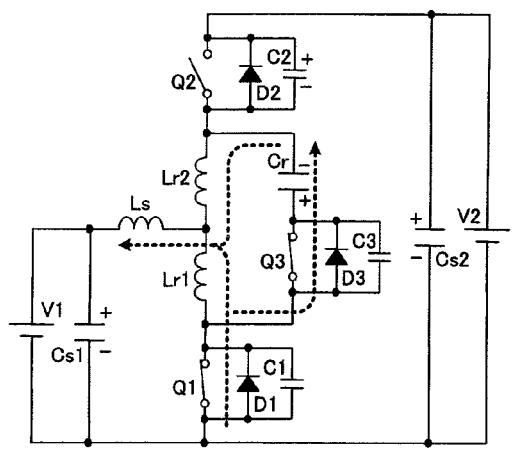
Figure 5B:
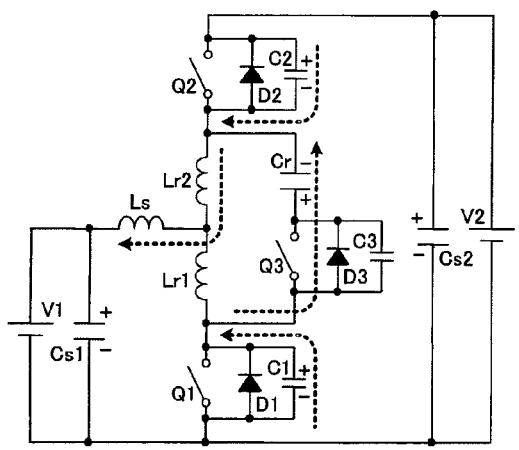
Figure 5E:
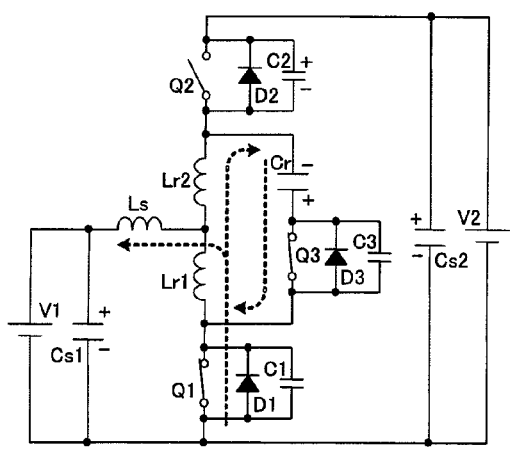
Figure 5C:
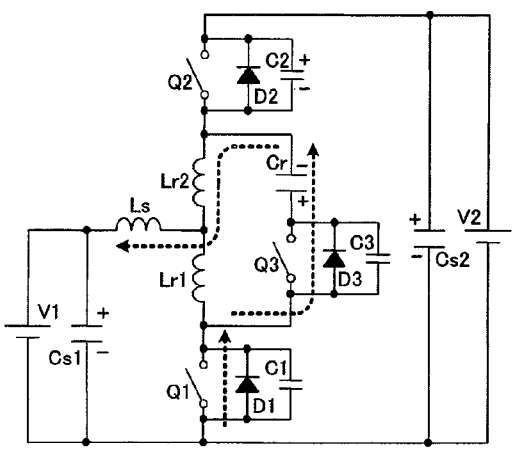
Figure 5F:
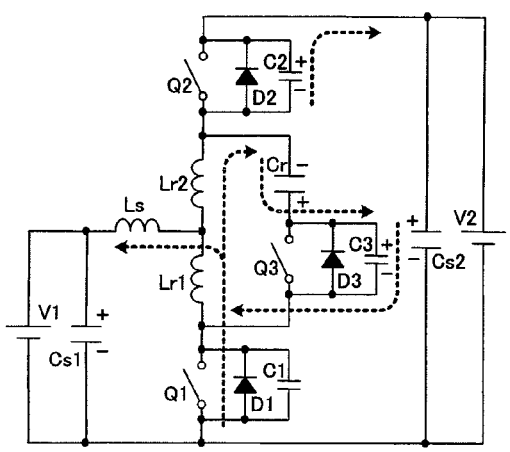

IBGT Q2 is then turned off at time t1. Voltage VQ2 at buffer capacitor C2 connected in parallel to IGBT Q2 gradually increases from zero at this time. Therefore, IGBT Q2 undergoes zero-voltage switching at time t1. As voltage VQ2 increases, the voltage between the emitter of IGBT Q2 and the emitter of IGBT Q1 decreases. However, currents ILr1 and ILr2 in the resonant reactors Lr1 and Lr2 do not change rapidly with time. Buffer capacitors C1 and C3 release their stored charges, causing voltages VQ1 and VQ3 to drop. When VQ3 reaches a voltage of 0 V, diode D3 is turned on. FIG. 5B shows the state of the circuit at that time. Specifically, the current flowing in buffer capacitor C1 flows into buffer capacitor C3 (diode D3 when voltage VQ3 is 0 V) and the resonant capacitor Cr, and is then combined with the current that has passed through buffer capacitor C2; the resulting current flows into resonant reactor Lr2 and the smoothing reactor Ls. From another viewpoint, resonant reactors Lr1 and Lr2 function so that the current ILs in the smoothing reactor Ls flows into the resonant capacitor Cr.

(Mode C)

When voltage VQ1 then reaches a voltage of 0 V at time t2, diode D1 is turned on, bringing the state in mode C. The current flowing in diode D1 flows into diode D3, the resonant capacitor Cr, and resonant reactor Lr2, and then flows into the smoothing reactor Ls. The voltage in the resonant capacitor Cr is then applied to the series circuit comprising resonant reactors Lr1 and Lr2, causing currents ILr1 and ILr2 to change with time in the positive direction. Specifically, part of the current flowing in diode D1 flows into resonant reactor Lr1 and is then combined with the current that has passed through resonant reactor Lr2; the resulting current flows into the smoothing reactor Ls. At this time, the power supply V2's energy stored in the smoothing reactor Ls is supplied to power supply V1, and the current ILs gradually decreases. Part of the energy stored in the smoothing reactor Ls and resonant reactor Lr2 is stored in the resonant capacitor Cr.

(Mode D)

IGBTs Q1 and Q3 are then turned on at time t3. Incidentally, IGBT Q1 may not be turned on. IGBT Q1 may be left turned on or off in a period from time t3 to time t9 described below. Since voltages VQ1 and VQ3 are zero at time t3, IGBTs Q1 and Q3 undergo zero-voltage switching, bringing the state in mode D. The current flowing diode D1 is divided into current that flows into resonant reactor Lr1 and current that flows into diode D3. The current flowing in diode D3 flows into resonant capacitor Cr and resonant reactor Lr2 and is then combined with the current that has passed through resonant reactor Lr1; the resulting current flows into the smoothing reactor Ls. Currents ILr1 and ILr2 change with time in the positive direction, as in mode C, so the value of current ILr2 decreases and current ILr1 increases. At this time, the power supply V2's energy stored in the smoothing reactor Ls is supplied to power supply V1, and the current ILs gradually decreases. Part of the energy stored in the smoothing reactor Ls and resonant reactor Lr2 is stored in the resonant capacitor Cr.

(Mode E)

Current ILr2 then changes from negative to positive at time t4, the state in mode E. The current flowing in diode D1 flows into resonant reactor Lr1 and the smoothing reactor Ls, the power supply V2's energy stored in the smoothing reactor Ls is supplied to power supply V1, and the current ILs gradually decreases. Since IGBT Q3 is in the on state, the voltage in the resonant capacitor Cr continues to be applied to the series circuit comprising resonant reactors Lr1 and Lr2. The resonant capacitor Cr releases charges in a path extending through IGBT Q3, resonant reactor Lr1, resonant reactor Lr2, and the resonant capacitor Cr in that order; the energy in the resonant capacitor Cr is stored in resonant reactors Lr1 and Lr2.

(Mode F)

IGBTs Q1 and Q3 are then turned off at time t5, bringing the state in mode F. IGBT Q1 may be tuned off before time t9 described below arrives. Voltage VQ3 at buffer capacitor C3 connected in parallel to IGBT Q3 gradually increases from zero at this time. Therefore, IGBT Q3 undergoes zero-voltage switching at time t5. Since voltage VQ2 decreases as voltage VQ3 increases, buffer capacitor C2 releases its stored charges. Currents ILr1 and ILr2 in the resonant reactors Lr1 and Lr2 do not change rapidly with time. Accordingly, the discharge current in the buffer capacitor C2 decreases the discharge current in the resonant capacitor Cr and increases the conducting current of diode D1. The current flowing in diode D1 continues to flow into resonant reactor Lr1 and the smoothing reactor Ls, the power supply V2's energy stored in the smoothing reactor Ls is supplied to power supply V1, and the current ILs gradually decreases.

(Mode G)

Figure 6G:
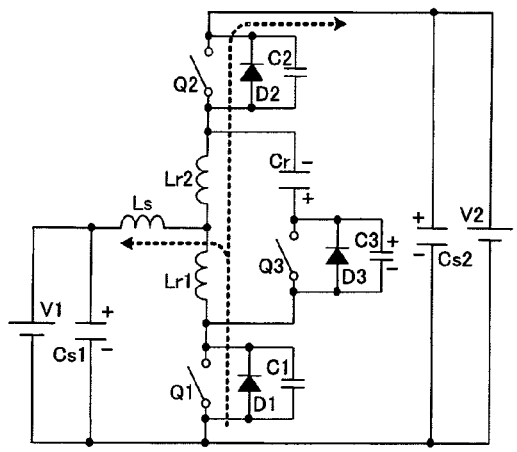
FIGS. 6G to 6L are also circuit diagrams, each of which illustrates a buck operation of the bidirectional DC-DC converter in the first embodiment of the present invention.
Figure 6J:
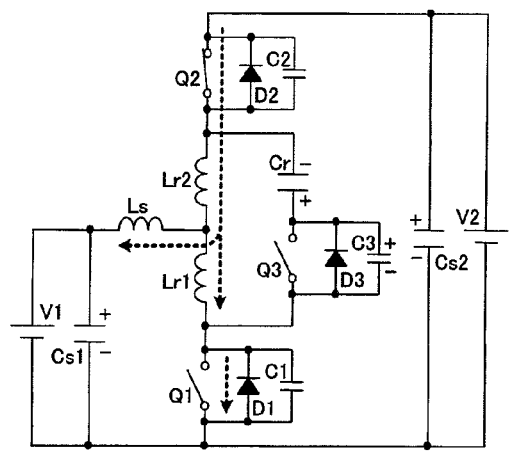
Figure 6H:
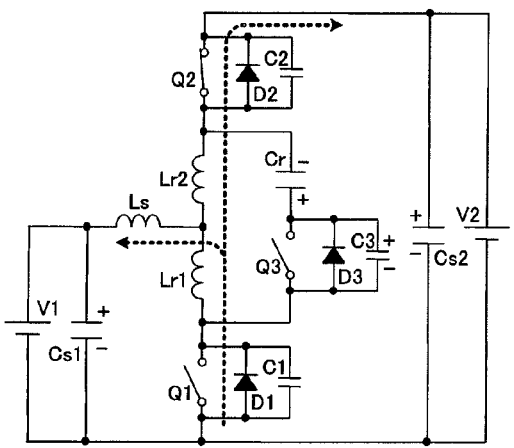
Figure 6K:
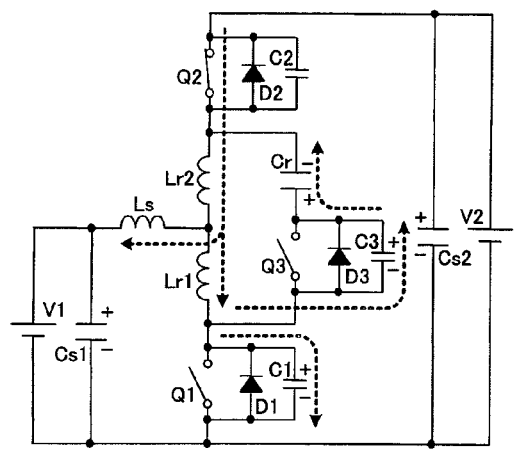
Figure 6I:
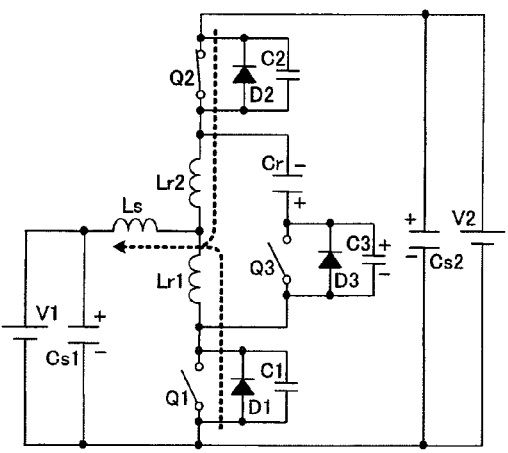
Figure 6L:
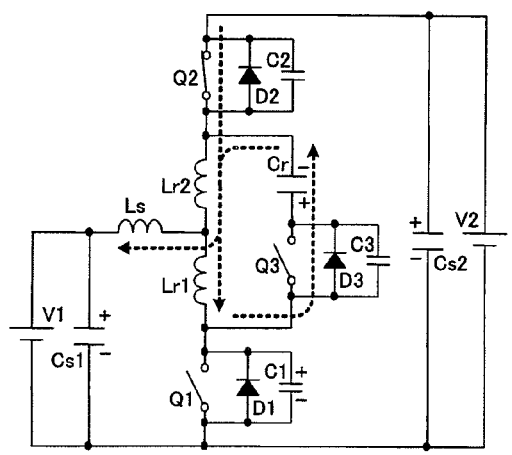
Figure 7:
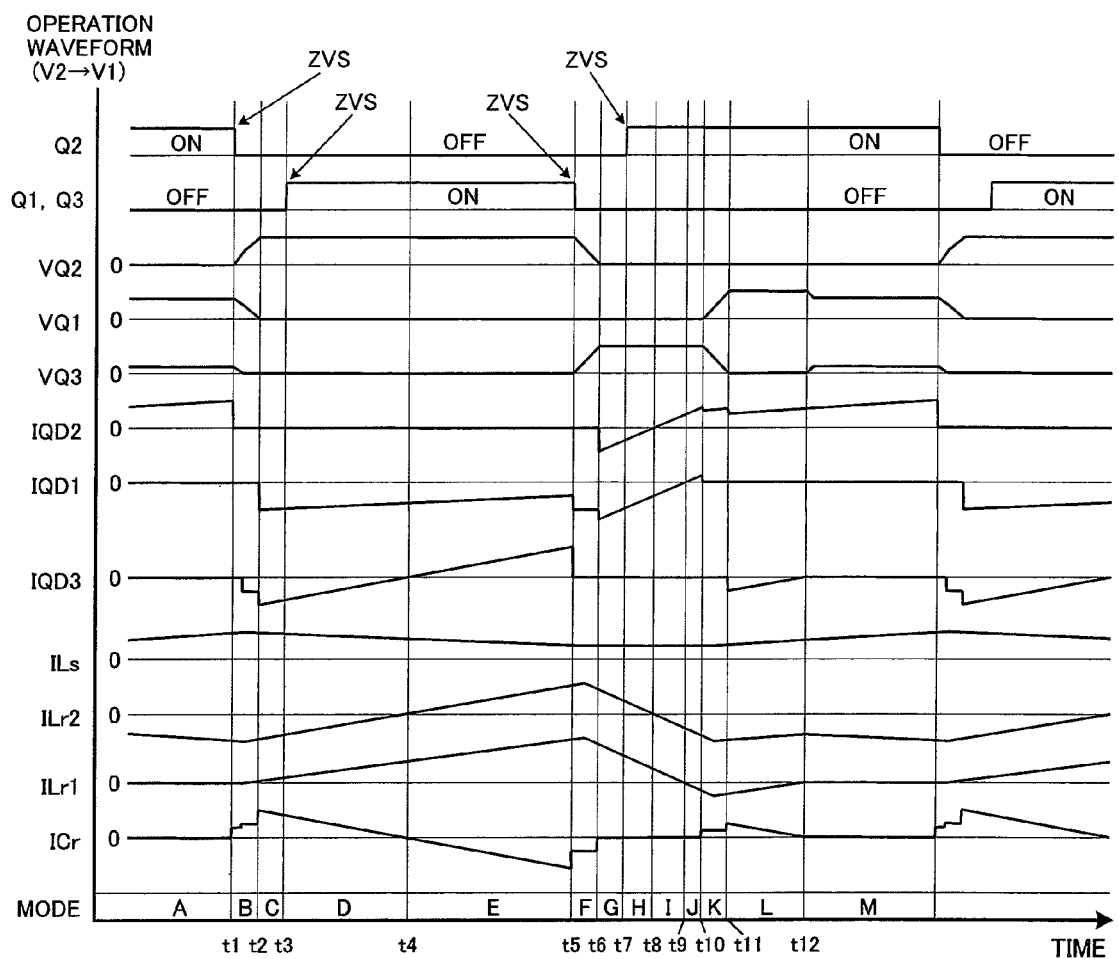
FIG. 7 shows voltage and current waveforms for illustrating the buck operation of the bidirectional DC-DC converter in the first embodiment of the present invention.

When voltage VQ2 then reaches a voltage of 0 V at time t6, diode D2 is turned on, bringing the state in mode G shown in FIG. 6G. The charging of buffer capacitor C3 is completed, and the current that has flowed in the resonant capacitor Cr in mode F flows into diode D1. The current flowing in diode D1 passes through resonant reactor Lr1 and is divided into current that flows into the smoothing reactor Ls and current that flows into resonant reactor Lr2. The current flowing in resonant reactor Lr2 flows into diode D2. The voltage of power supply V2 is applied to the series circuit comprising resonant reactors Lr1 and Lr2, the energy stored in the resonant reactors Lr1 and Lr2 is recovered into power supply V2, and currents ILr1 and ILr2 gradually decrease. The conducting currents in diodes D1 and D2 also decrease accordingly.

(Mode H)

IGBT Q2 is then turned on at time t7. Since voltage VQ2 at time t7 is 0 V, IGBT Q2 undergoes zero-voltage switching, bringing the state in mode H. The state of the circuit is the same as in mode G; the energy stored in the resonant reactors Lr1 and Lr2 is recovered into power supply V2, and currents ILr1 and ILr2 and the conducting currents in diodes D1 and D2 gradually decrease.

(Mode I)

Current ILr2 then changes from positive to negative at time t8, bringing the state in mode I. Since IGBT Q2 is in the on state, the voltage of power supply V2 continues to be applied to the series circuit comprising resonant reactors Lr1 and Lr2; the value of current ILr2 increases in the negative direction and current ILr1 decreases. The current flowing in diode D1 and resonant reactor Lr1 and the current flowing IGBT Q2 and resonant reactor Lr2 are combined; the resulting current flows into the smoothing reactor Ls. If IGBT Q1 is in the on state, it is tuned off before the period of mode I expires.

(Mode J)

Current ILr1 then changes from positive to negative at time t9, bringing the state in mode J. IGBT Q1 is in the off state. The J mode assures a period (reverse recovery time) required by diode D1 to change (reversely recover) from the on state to the off state. The voltage of power supply V2 continues to be applied to the series circuit comprising resonant reactors Lr1 and Lr2; the values of currents ILr1 and ILr2 increase in the negative direction. The current passing through IGBT Q2 flows into resonant reactor Lr2 and is then divided into current that flows into smoothing reactor Ls and current that flows into resonant reactor Lr1. The current that has passed through resonant reactor Lr1 is reverse current in diode D1.

(Mode K)

Diode D1 then reversely recovers at time t10, bringing the state in mode K. Voltage VQ1 at buffer capacitor C1 connected in parallel to IGBT Q1 gradually increases from zero at this time. Since voltage VQ3 decreases as voltage VQ1 increases, buffer capacitor C3 releases its stored charges. The discharge current of buffer capacitor C3 passes through the resonant capacitor Cr and is then combined with the current that has passed through IGBT Q2; the resulting current flows into resonant reactor Lr2 and is divided into current that flows into the smoothing reactor Ls and current that flows into resonant reactor Lr1. The current passing through resonant reactor Lr1 is further divided into current that flows into buffer capacitor C3 and current that flows into buffer capacitor C1. Accordingly, the discharge current in the buffer capacitor C3 decreases the current in IGBT Q2.

(Mode L)

When voltage VQ3 then reaches a voltage of 0 V at time t11, diode D3 is turned on, bringing the state in mode L. The charging of buffer capacitor C1 from power supply V2 is completed, reducing the current in IGBT Q2. Since currents ILr1 and ILr2 in the resonant reactors Lr1 and Lr2 do not change rapidly with time, the current for charging the resonant capacitor Cr increases. The power supply V2's energy is stored in the smoothing reactor Ls, and the current ILs gradually increases. The voltage of the resonant capacitor Cr is applied to the series circuit comprising resonant reactors Lr1 and Lr2, and currents ILr1 and ILr2 change with time in the positive direction. The energy stored in resonant reactors Lr1 and Lr2 is stored in the resonant capacitor Cr. The energy stored in resonant reactors Lr1 and Lr2 within the reserve recovery time of diode D1 can be thus recovered in the resonant capacitor Cr without causing a surge.

When the current in resonant reactor Lr1 then reaches zero at time t12, the state in mode A is brought again. Resonant current flows in resonant reactors Lr1 and Lr2, the resonant capacitor Cr, and buffer capacitor C3 at this time, which may cause waveforms to fluctuate.

Operation common to the boost operation and buck operation of the bidirectional DC-DC converter 10 according to the first embodiment of the present invention will be described below. First, in a period in which the smoothing reactor Ls releases the energy it stored, resonant reactors Lr1 and Lr2 bring part of the energy released by the smoothing reactor Ls to the resonant capacitor Cr. Diode D3 is turned on at this time; when IGBT Q3 is turned on, it undergoes zero-voltage switching. Next, the charges of the resonant capacitor Cr are released through IGBT Q3, and the energy in the resonant capacitor Cr is stored in resonant reactors Lr1 and Lr2. When IGBT Q3 is turned off, the current stored in resonant reactors Lr1 and Lr2 causes diodes D1 and D2 to be turned on, thereby causing IGBTs Q1 and Q2 to under go zero-voltage switching. The voltage stored in the resonant capacitor Cr and the current stored in resonant reactors Lr1 and Lr2 have the same polarity in the boost operation and buck operation. That is, the same principle is used to achieve soft switching, independently of the operation direction.

As described above, the bidirectional DC-DC converter 10 achieves zero-voltage soft switching for all elements without changing circuit connections in bidirectional operation. The energy stored in resonant reactors Lr1 and Lr2 within the reserve recovery times of diodes D1 and D2 can be thus recovered in the resonant capacitor Cr without causing a surge.

The bidirectional DC-DC converter 10 can thus accomplish easy control by use of a control means 2 that provides a period in which both IGBTs Q1 and Q3 are turned off together in the boost operation and another period in which both IGBTs Q2 and Q3 are turned off together in the buck operation and turns these IGBTs on and off alternately. If the direction in which the current flows in the smoothing reactor Ls is detected, it can be determined whether the operation is the boost operation or the buck operation. Therefore, a current sensor 3 for sensing the current flowing in the smoothing reactor Ls is provided. When the sensor 3 senses that the current flowing in the smoothing reactor Ls is directed from the smoothing reactor Ls to node N0, the control means 2 provides a period in which both IGBTs Q1 and Q3 are turned off together, and turns on and off them alternately. When the sensor 3 senses that the current flowing in the smoothing reactor Ls is directed from node N0 to the smoothing reactor Ls, the control means 2 provides a period in which both IGBTs Q2 and Q3 are turned off together, and turns on and off them alternately. This facilitates control.

Although resonant reactors Lr1 and Lr2 are magnetically coupled in the first embodiment, they do not necessarily have to be magnetically coupled. Either of resonant reactors Lr1 and Lr2 can be eliminated for compactness, as described in second and third embodiments below.

Second Embodiment

Figure 8:
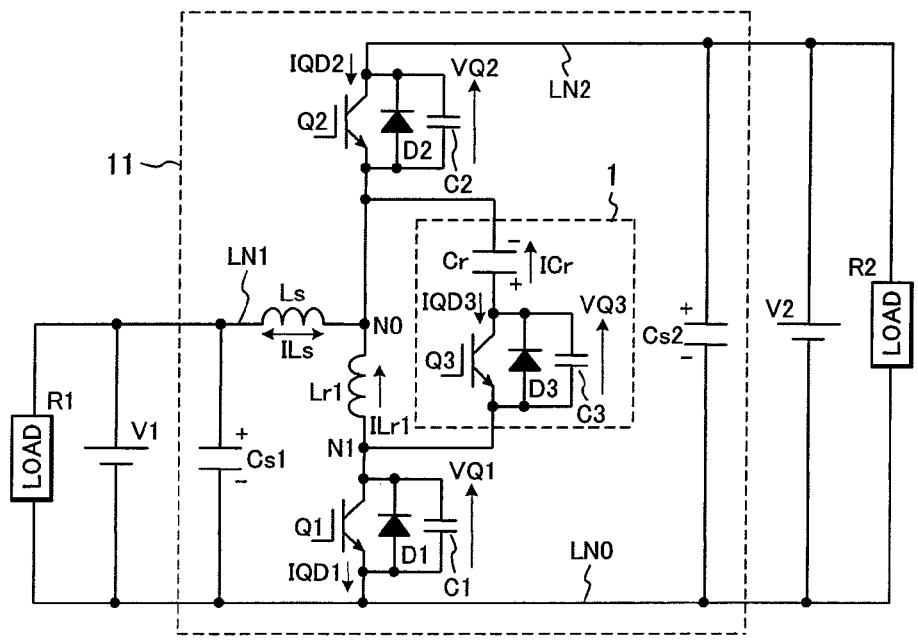
FIG. 8 shows a main circuit diagram of a bidirectional DC-DC converter according to a second embodiment of the present invention.

FIG. 8 shows a main circuit diagram of a bidirectional DC-DC converter according to a second embodiment of the present invention. The bidirectional DC-DC converter 11 in the second embodiment is structured by removing resonant reactor Lr2 from the bidirectional DC-DC converter 10 in the first embodiment shown in FIG. 1 and restoring the connection.

The circuit operations and control method are the same as with the bidirectional DC-DC converter 10 in the first embodiment. The waveforms in the circuits are the same as in FIGS. 4 and 7.

Third Embodiment

Figure 9:
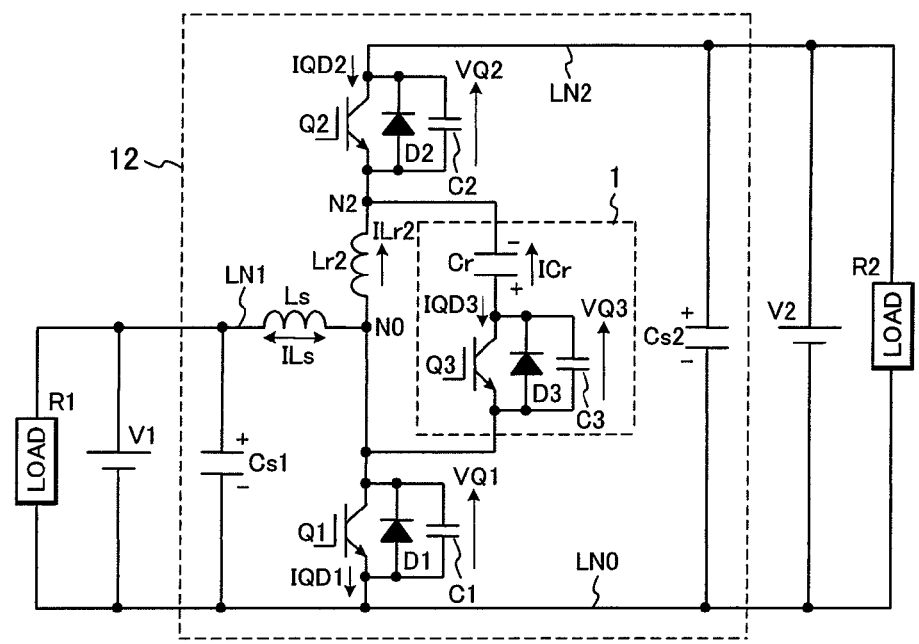
FIG. 9 shows a main circuit diagram of a bidirectional DC-DC converter according to a third embodiment of the present invention.

FIG. 9 shows a main circuit diagram of a bidirectional DC-DC converter according to a third embodiment of the present invention. The bidirectional DC-DC converter 12 in the third embodiment is structured by removing resonant reactor Lr1 from the bidirectional DC-DC converter 10 in the first embodiment shown in FIG. 1 and restoring the connection.

The circuit operations and control method are the same as with the bidirectional DC-DC converter 10 in the first embodiment. The waveforms at various parts in the circuit are the same as in FIGS. 4 and 7.

Fourth Embodiment

In the bidirectional DC-DC converter 10 in the first embodiment, IGBTs Q1 and Q2 are not interconnected, so an IGBT module in which a collector and emitter of two IGBTs are interconnected cannot be used. In the bidirectional DC-DC converter 13 in a fourth embodiment, therefore, its circuit connection is such that an IGBT module can be used.

Figure 10:
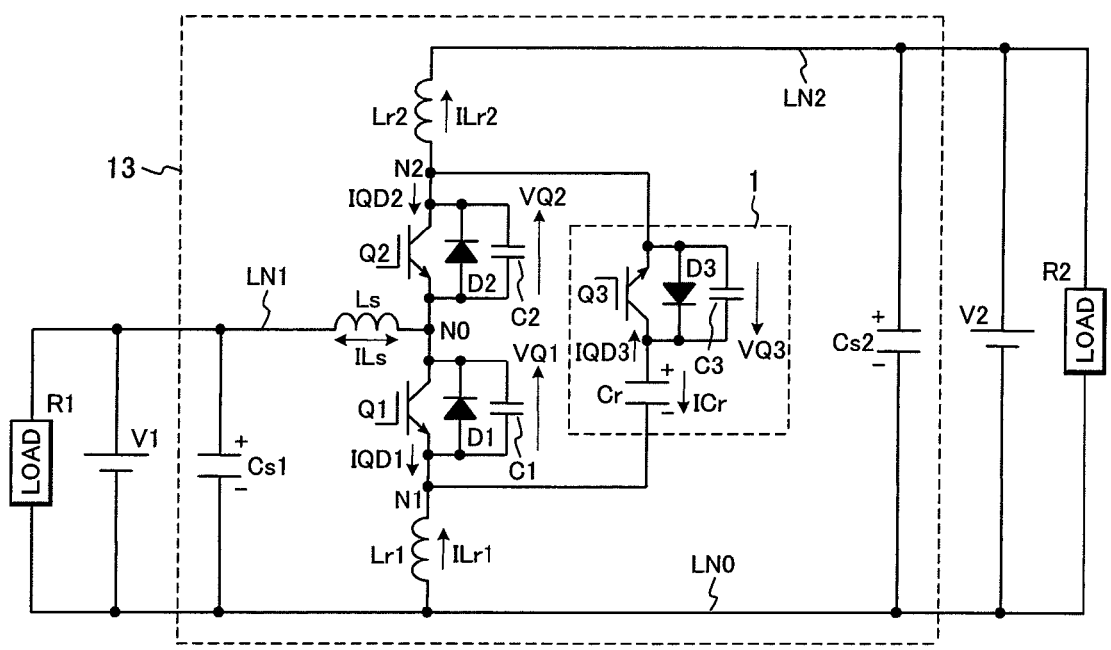
FIG. 10 shows a main circuit diagram of a bidirectional DC-DC converter according to a fourth embodiment of the present invention.
Figure 11A:
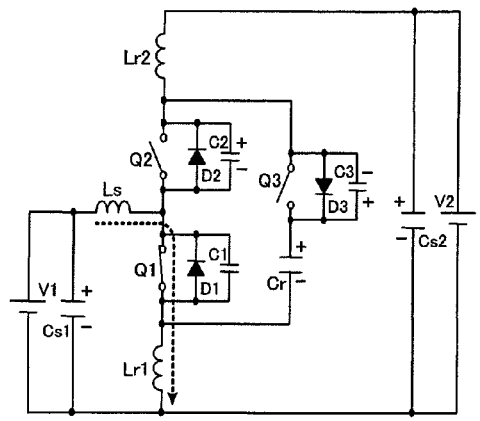
FIGS. 11A to 11F are circuit diagrams, each of which illustrates a boost operation of the bidirectional DC-DC converter in the fourth embodiment of the present invention.
Figure 11D:
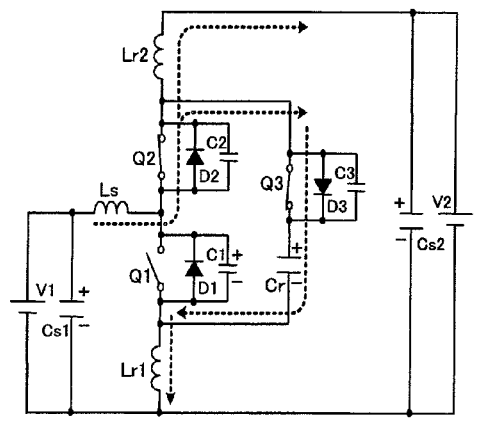
Figure 11B:
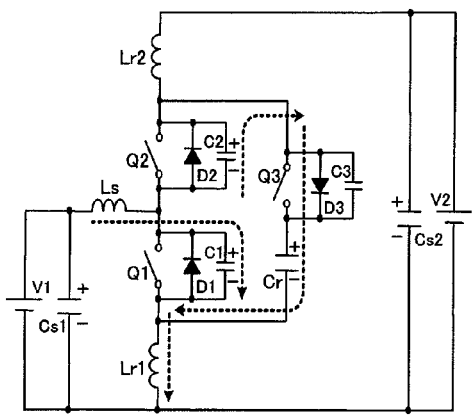
Figure 11E:
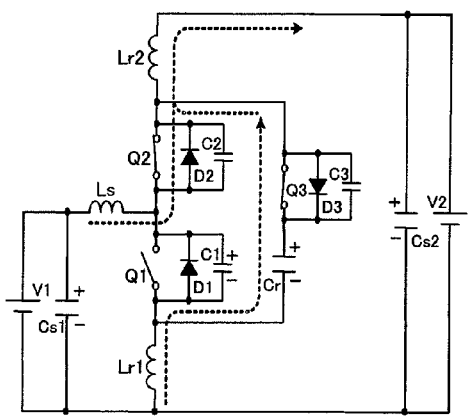
Figure 11C:
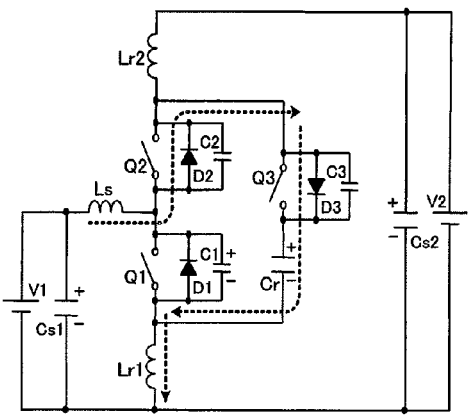
Figure 11F:
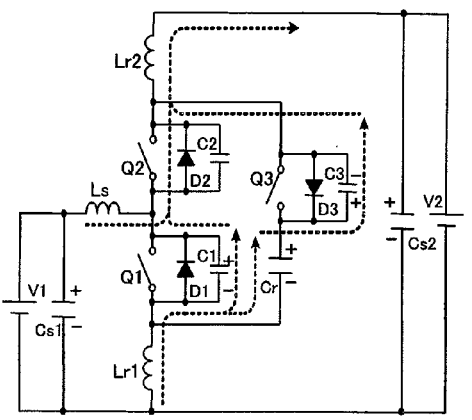
Figure 12G:
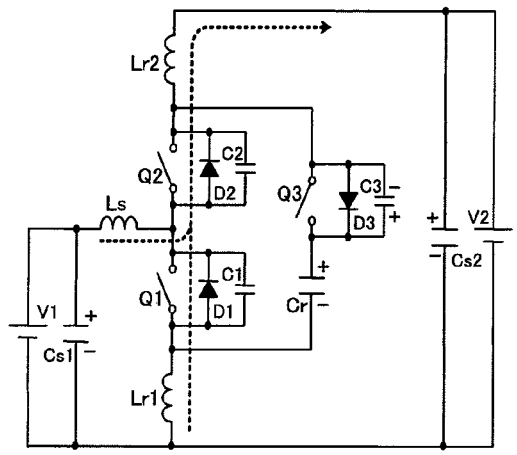
FIGS. 12G to 12L are also circuit diagrams, each of which illustrates a boost operation of the bidirectional DC-DC converter in the fourth embodiment of the present invention.
Figure 12J:
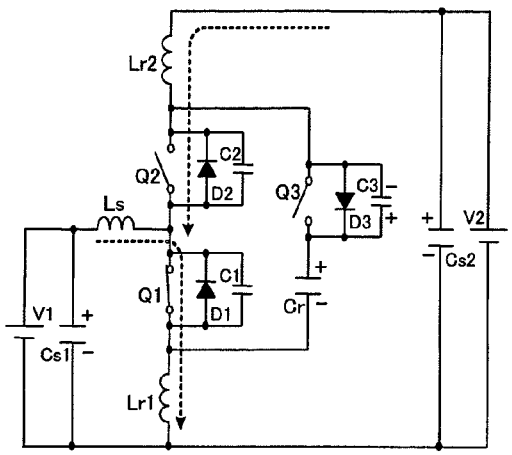
Figure 12H:
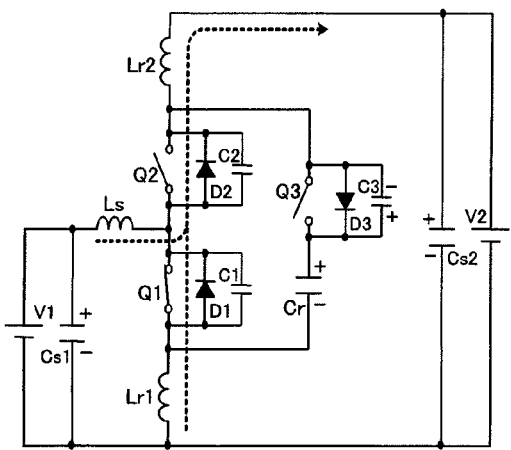
Figure 12K:
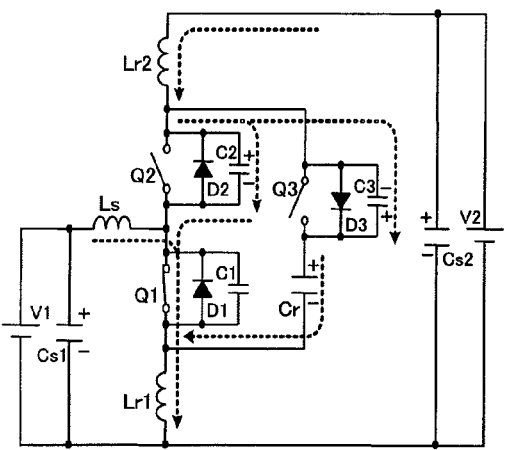
Figure 12I:
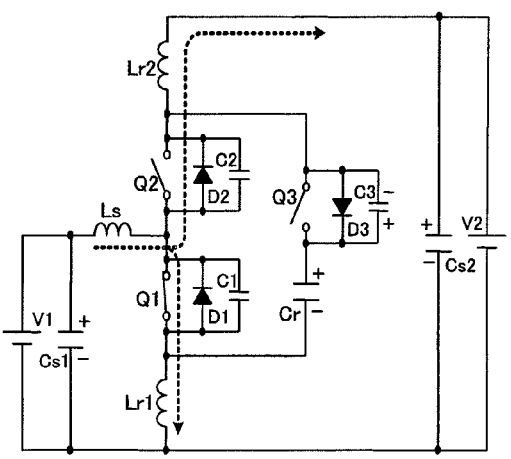
Figure 12L:
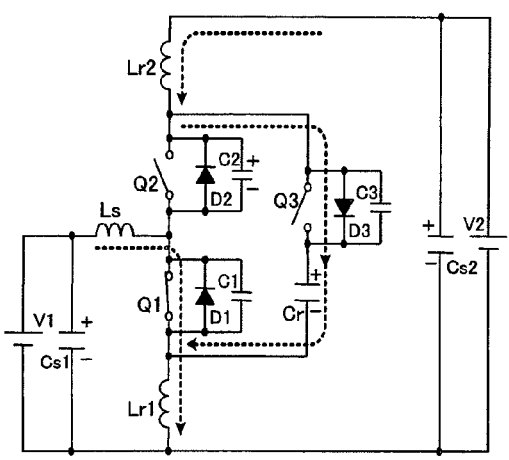
Figure 13A:
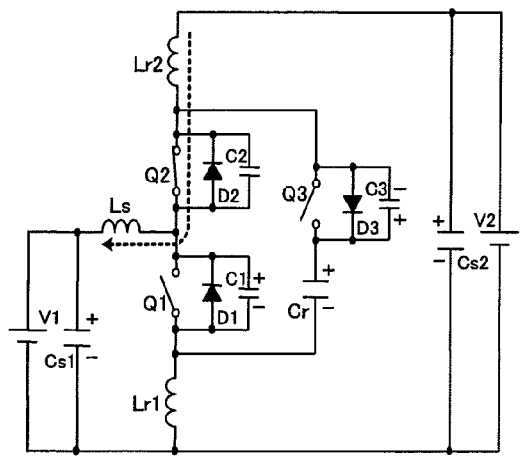
FIGS. 13A to 13F are circuit diagrams, each of which illustrates a buck operation of the bidirectional DC-DC converter in the fourth embodiment of the present invention.
Figure 13D:
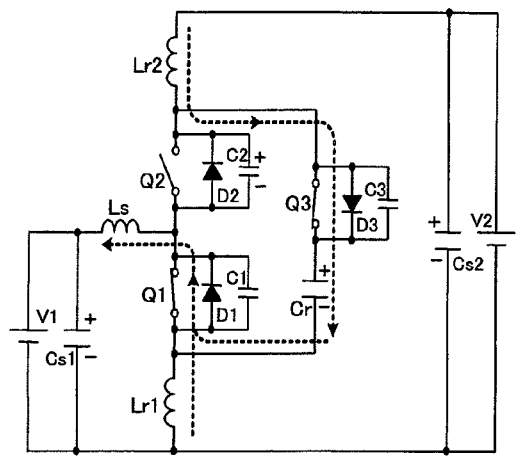
Figure 13B:
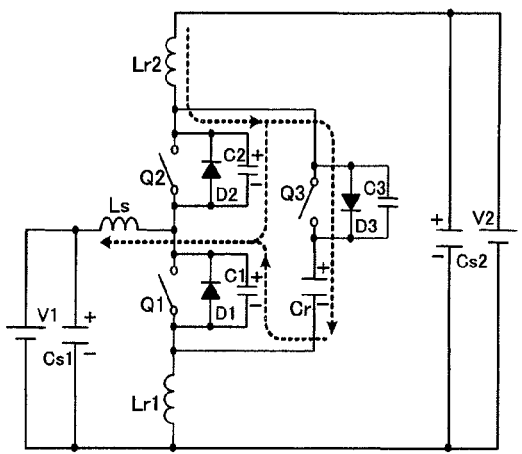
Figure 13E:
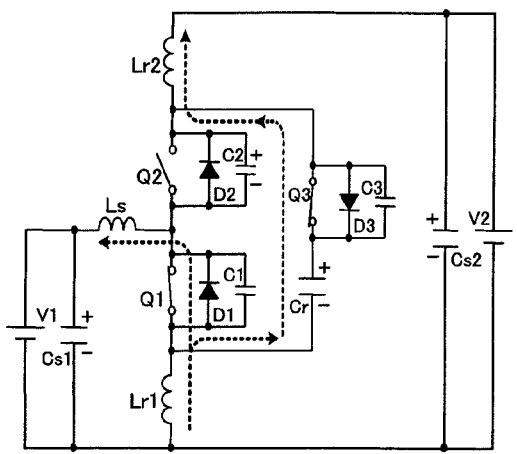
Figure 13C:
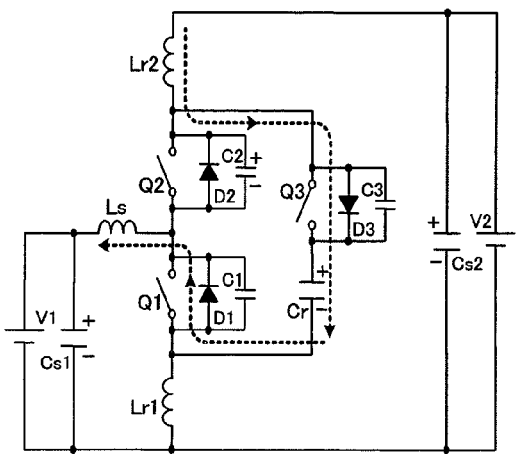
Figure 13F:
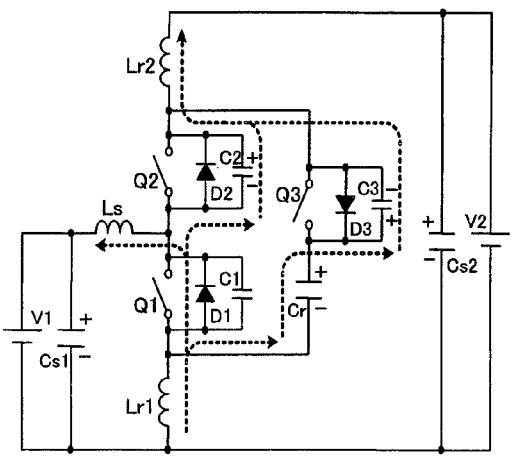
Figure 14G:
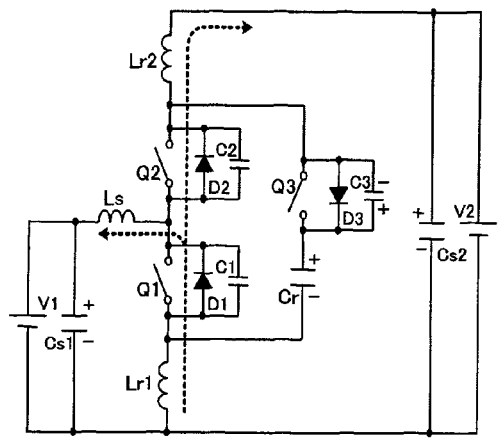
FIGS. 14G to 14L are also circuit diagrams, each of which illustrates a buck operation of the bidirectional DC-DC converter in the fourth embodiment of the present invention.
Figure 14J:
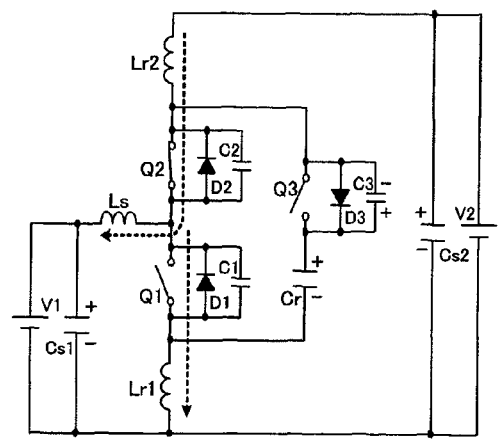
Figure 14H:
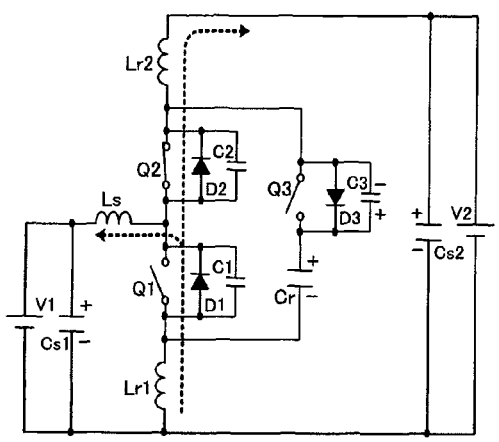
Figure 14K:
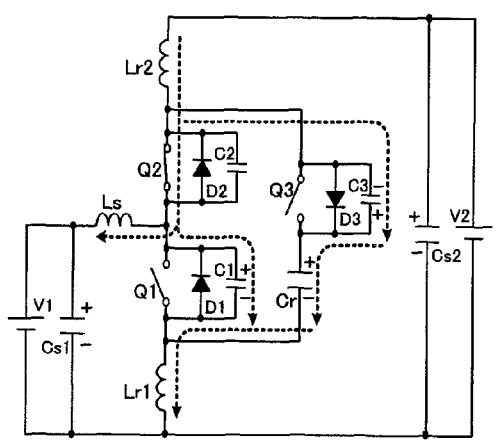
Figure 14I:
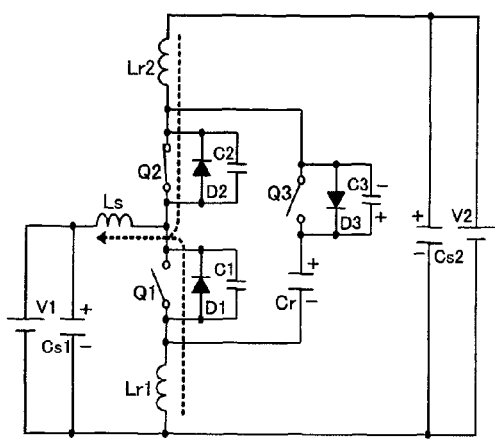
Figure 14L:
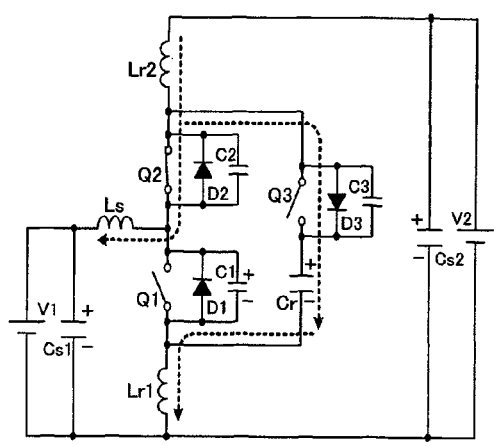

FIG. 10 shows a main circuit diagram of a bidirectional DC-DC converter according to the fourth embodiment of the present invention. In the main circuit of the bidirectional DC-DC converter 13 in the fourth embodiment, first IGBT Q1 and resonant reactor Lr1 in FIG. 1 are mutually exchanged and second IGBT Q2 and resonant reactor Lr2 also in FIG. 1 are mutually exchanged; the circuit elements are the same as in FIG. 1.

Only differences from FIG. 1 will be described. The collector of IGBT Q1 and the emitter of IGBT Q2 are connected to node N0. Resonant reactor Lr1 is connected between the emitter of IGBT Q1 and negative bus LN0, and resonant reactor Lr2 is connected between the collector of IGBT Q2 and positive bus LN2. The connection point between IGBT Q1 and resonant reactor Lr1 is called node N1, and the connection point between IGBT Q2 and resonant reactor Lr2 is called node N2. IGBT Q3 and a resonant capacitor Cr are interconnected in series to form an active resonant circuit. Another active resonant circuit is formed between node N1 and node N2 in such a way that the emitter of IGBT Q3 faces node N2.

Symbols representing the voltages and currents in the circuit diagram in FIG. 10 will be defined. Current ILr1 flowing in resonant reactor Lr1 is positive when it flows from negative bus LN0 to node N1, and current ILr2 flowing in resonant reactor Lr2 is positive when it flows from node N2 to positive bus LN2. The definitions of the symbols for the other voltages and currents are the same as for the bidirectional DC-DC converter 10 in the first embodiment.

FIGS. 11A to 11F and FIGS. 12G to 12L are circuit diagrams, each of which illustrates a boost operation of the bidirectional DC-DC converter in the fourth embodiment of the present invention. FIGS. 13A to 13F and FIGS. 14G to 14L are circuit diagrams, each of which illustrates a buck operation of the bidirectional DC-DC converter in the fourth embodiment of the present invention. The control method is the same as for the bidirectional DC-DC converter 10 in the first embodiment. The waveforms at various parts in the circuit are the same as in FIGS. 4 and 7.

Resonant reactors Lr1 and Lr2 incorporated in the bidirectional DC-DC converter 13 in the fourth embodiment may be magnetically coupled (not shown). The use of a common core increases the usage efficiency of the core and makes the core compact. Alternatively, either of resonant reactors Lr1 and Lr2 may be eliminated for compactness, as described in a fifth embodiment (FIG. 15) to a tenth embodiment (FIG. 20) below.

Fifth Embodiment

Figure 15:
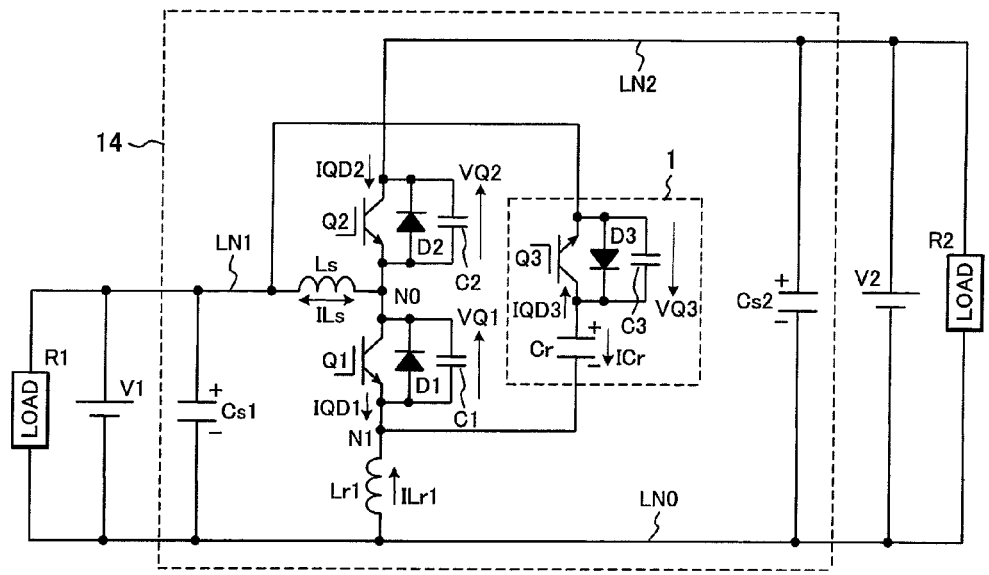
FIG. 15 shows a main circuit diagram of a bidirectional DC-DC converter according to a fifth embodiment of the present invention.

FIG. 15 shows a main circuit diagram of a bidirectional DC-DC converter according to a fifth embodiment of the present invention. The bidirectional DC-DC converter 14 in the fifth embodiment is structured by removing resonant reactor Lr2 from the bidirectional DC-DC converter 13 in the fourth embodiment shown in FIG. 10 and restoring the connection and by disconnecting one end of the active resonant circuit from node N2 and reconnecting it to positive bus line LN1.

The circuit operations and control method are the same as with the bidirectional DC-DC converter 13 in the fourth embodiment shown in FIG. 10. The waveforms at various parts in the circuit are the same as in FIGS. 4 and 7.

Sixth Embodiment

Figure 16:
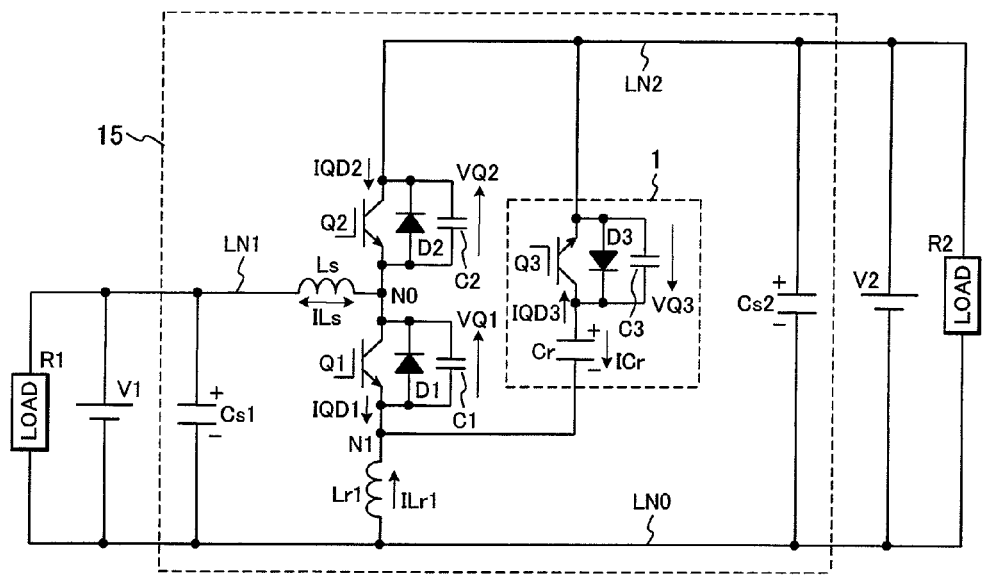
FIG. 16 shows a main circuit diagram of a bidirectional DC-DC converter according to a sixth embodiment of the present invention.

FIG. 16 shows a main circuit diagram of a bidirectional DC-DC converter according to a sixth embodiment of the present invention. The bidirectional DC-DC converter 15 in the sixth embodiment is structured by removing resonant reactor Lr2 from the bidirectional DC-DC converter 13 in the fourth embodiment shown in FIG. 10 and restoring the connection and by disconnecting one end of the active resonant circuit from node N2 and reconnecting it to positive bus line LN2.

The circuit operations and control method are the same as with the bidirectional DC-DC converter 13 in the fourth embodiment shown in FIG. 10. The waveforms at various parts in the circuit are the same as in FIGS. 4 and 7.

Seventh Embodiment

Figure 17:
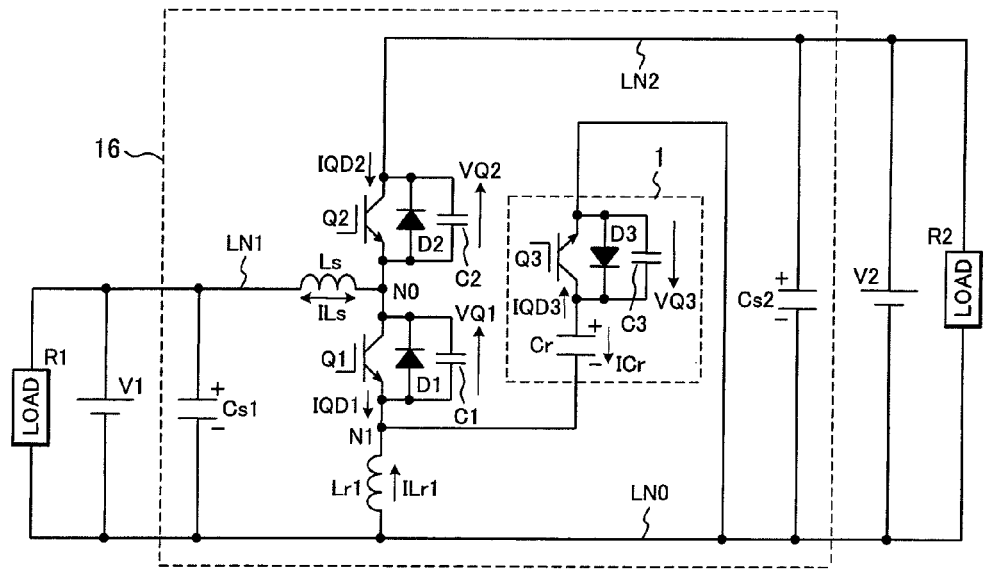
FIG. 17 shows a main circuit diagram of a bidirectional DC-DC converter according to a seventh embodiment of the present invention.

FIG. 17 shows a main circuit diagram of a bidirectional DC-DC converter according to a seventh embodiment of the present invention. The bidirectional DC-DC converter 16 in the seventh embodiment is structured by removing resonant reactor Lr2 from the bidirectional DC-DC converter 13 in the fourth embodiment shown in FIG. 10 and restoring the connection and by disconnecting one end of the active resonant circuit from node N2 and reconnecting it to negative bus line LN0.

The circuit operations and control method are the same as with the bidirectional DC-DC converter 13 in the fourth embodiment shown in FIG. 10. The waveforms at various parts in the circuit are the same as in FIGS. 4 and 7.

Eighth Embodiment

Figure 18:
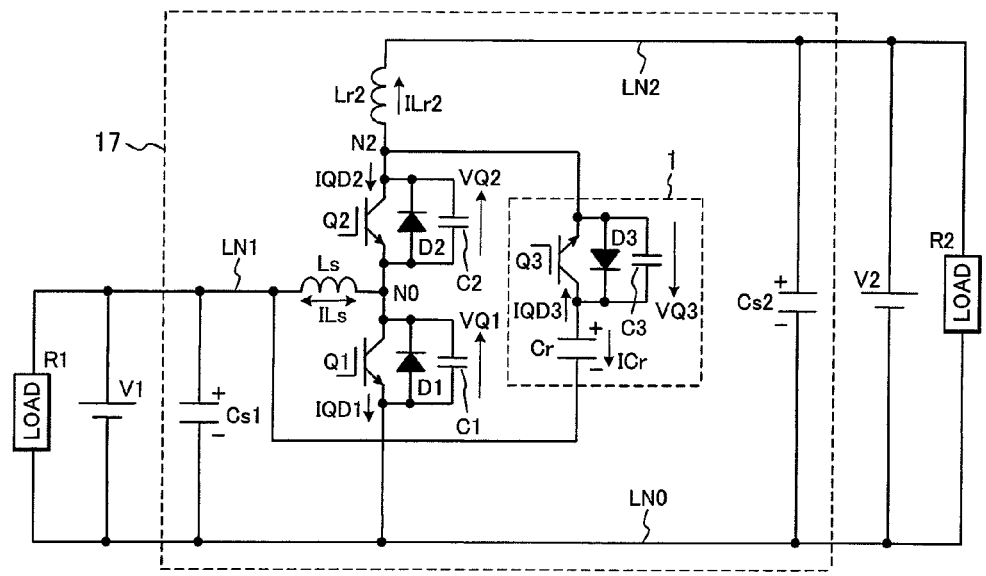
FIG. 18 shows a main circuit diagram of a bidirectional DC-DC converter according to an eighth embodiment of the present invention.

FIG. 18 shows a main circuit diagram of a bidirectional DC-DC converter according to an eighth embodiment of the present invention. The bidirectional DC-DC converter 17 in the eighth embodiment is structured by removing resonant reactor Lr1 from the bidirectional DC-DC converter 13 in the fourth embodiment shown in FIG. 10 and restoring the connection and by disconnecting one end of the active resonant circuit from node N1 and reconnecting it to positive bus line LN1.

The circuit operations and control method are the same as with the bidirectional DC-DC converter 13 in the fourth embodiment. The waveforms at various parts in the circuit are the same as in FIGS. 4 and 7.

Ninth Embodiment

Figure 19:
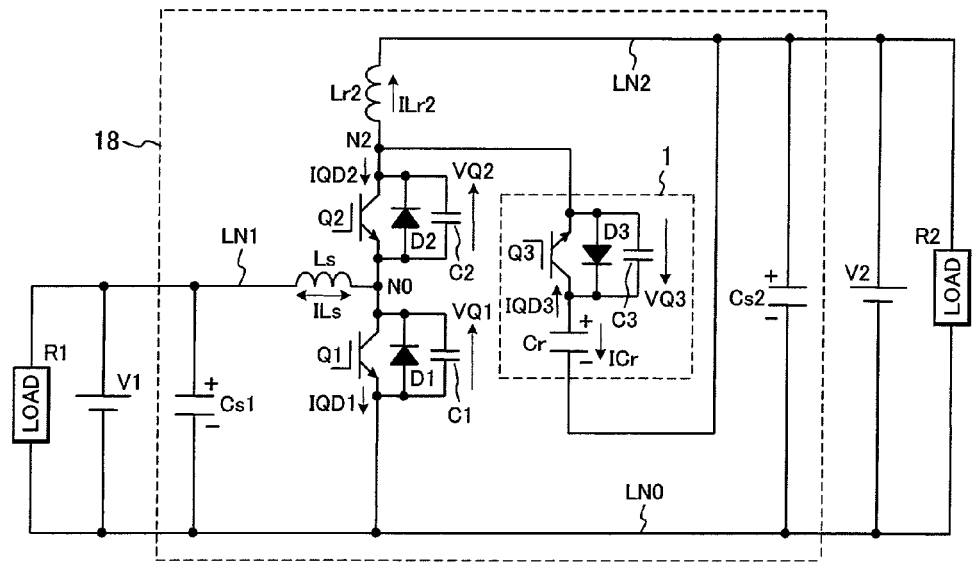
FIG. 19 shows a main circuit diagram of a bidirectional DC-DC converter according to a ninth embodiment of the present invention.

FIG. 19 shows a main circuit diagram of a bidirectional DC-DC converter according to a ninth embodiment of the present invention. The bidirectional DC-DC converter 18 in the ninth embodiment is structured by removing resonant reactor Lr1 from the bidirectional DC-DC converter 13 in the fourth embodiment shown in FIG. 10 and restoring the connection and by disconnecting one end of the active resonant circuit from node N1 and reconnecting it to positive bus line LN2.

The circuit operations and control method are the same as with the bidirectional DC-DC converter 13 in the fourth embodiment. The waveforms at various parts in the circuit are the same as in FIGS. 4 and 7.

Tenth Embodiment

Figure 20:
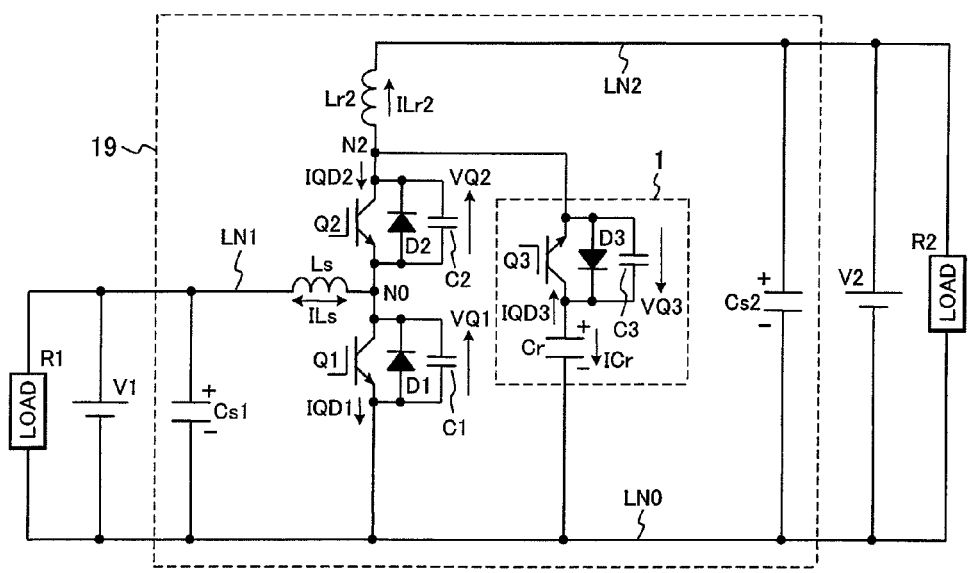
FIG. 20 shows a main circuit diagram of a bidirectional DC-DC converter according to a tenth embodiment of the present invention.

FIG. 20 shows a main circuit diagram of a bidirectional DC-DC converter according to a tenth embodiment of the present invention. The bidirectional DC-DC converter 19 in the tenth embodiment is structured by removing resonant reactor Lr1 from the bidirectional DC-DC converter 13 in the fourth embodiment shown in FIG. 10 and restoring the connection and by disconnecting one end of the active resonant circuit from node N1 and reconnecting it to negative bus line LN0.

The circuit operations and control method are the same as with the bidirectional DC-DC converter 13 in the fourth embodiment. The waveforms at various parts in the circuit are the same as in FIGS. 4 and 7.

Eleventh Embodiment

Figure 21:
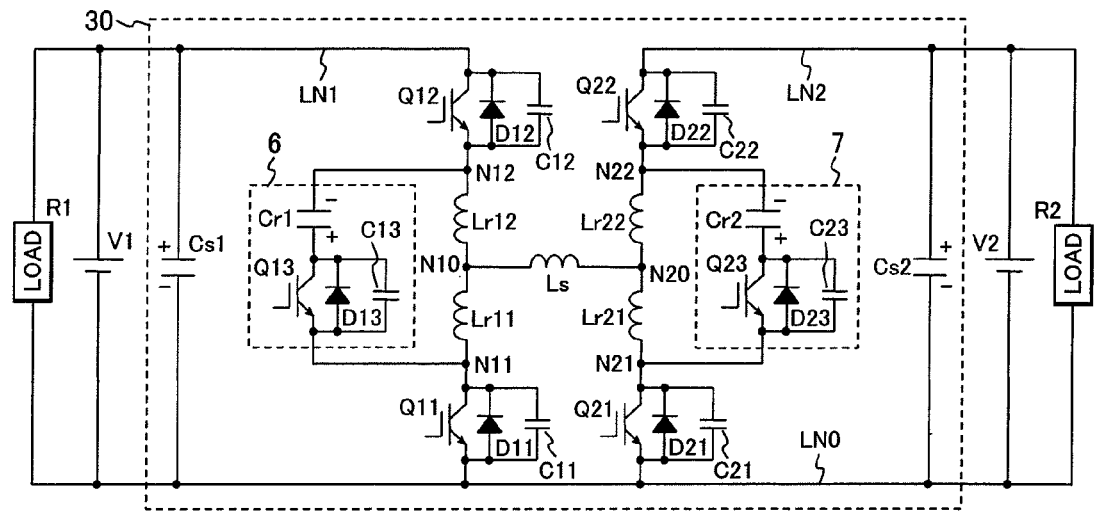
FIG. 21 shows a main circuit diagram of a bidirectional DC-DC converter according to an eleventh embodiment of the present invention.

FIG. 21 shows a main circuit diagram of a bidirectional DC-DC converter according to an eleventh embodiment of the present invention. The bidirectional DC-DC converter 30 in FIG. 21 differs from the first embodiment in FIG. 1 in that the circuit to the right of smoothing reactor Ls in FIG. 1 is also provided to the left of smoothing reactor Ls. Accordingly, the bidirectional DC-DC converter 30 has a first vertical arm formed by interconnecting first and second switching devices Q11 and Q12 in series and a second vertical arm formed by interconnecting third and fourth switching devices Q21 and Q22 in series. The bidirectional DC-DC converter 30 also has a smoothing reactor Ls, one end of which is connected to the series connection point between first and second switching devices Q11 and Q12 and the other end of which is connected to the series connection point between third and fourth switching devices Q21 and Q22. The bidirectional DC-DC converter 30 also includes a first smoothing reactor Cs1 connected to both ends of the first vertical arm and connected in parallel to a first power supply V1 as well as a second smoothing reactor Cs2 connected to both ends of the second vertical arm and connected in parallel to a second power supply V2. First resonant reactors Lr11 and Lr12 are connected in series to first and second switching devices Q11 and Q12, respectively. Similarly, second resonant reactors Lr21 and Lr22 are connected in series to the third and fourth switching devices Q21 and Q22, respectively. As described in the previous embodiments, both resonant reactors Lr11 and Lr12 and both resonant reactors Lr21 and Lr22 are not necessarily provided; at least either of them is sufficient.

A first active resonant circuit 6 is formed by connecting a fifth switching device Q13 to a first resonant capacitor Cr1 in series. Similarly, a second active resonant circuit 7 is formed by connecting a sixth switching device Q23 to a second resonant capacitor Cr2 in series. A bidirectional DC-DC converter 30 enabling soft switching is thereby structured.

This embodiment has boost and buck functions executed in bidirectional operations in which energy in power supply V1 is transferred to power supply V2 and energy in power supply V2 is transferred to power supply V1. In this embodiment, the bidirectional DC-DC converter 10 in the first embodiment in FIG. 1 is duplicated, so circuit operations and a control method would be understood as in FIG. 1.

Twelfth Embodiment

Next, bidirectional DC-DC converters in a twelfth embodiment (FIG. 22) to a twenty-first embodiment (FIG. 39) will be described in which only a pair of main elements are used as the main switching devices and boost and buck functions are used to transfer energy during bidirectional operations between power supply V1 and power supply V2.

Figure 22:
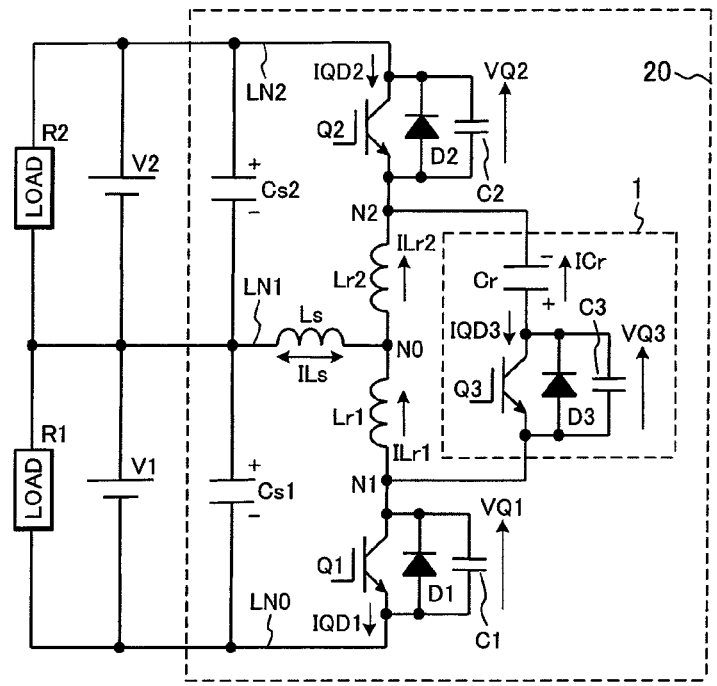
FIG. 22 shows a main circuit diagram of a bidirectional DC-DC converter according to a twelfth embodiment of the present invention.
Figure 23A:
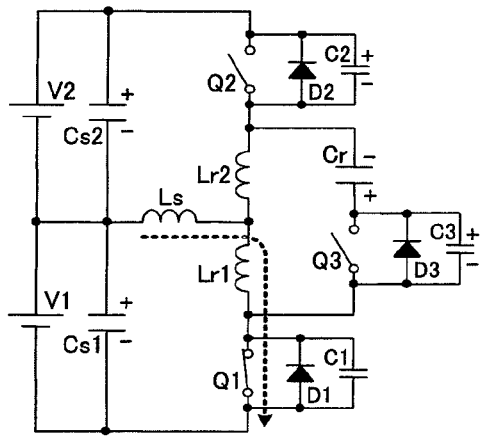
FIGS. 23A to 23F are circuit diagrams, each of which illustrates an operation in which the bidirectional DC-DC converter in the twelfth embodiment of the present invention transfers energy in power supply V1 to power supply V2.
Figure 23D:
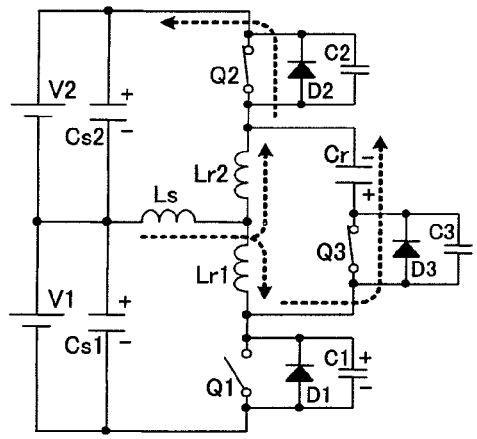
Figure 23B:
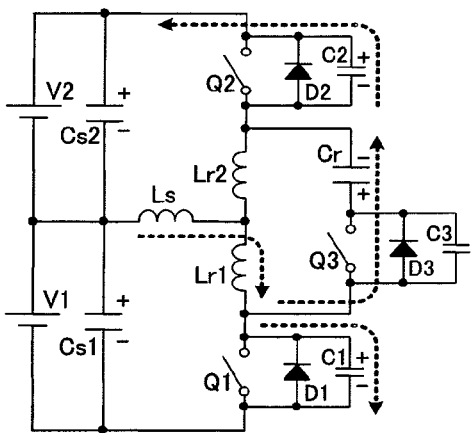
Figure 23E:
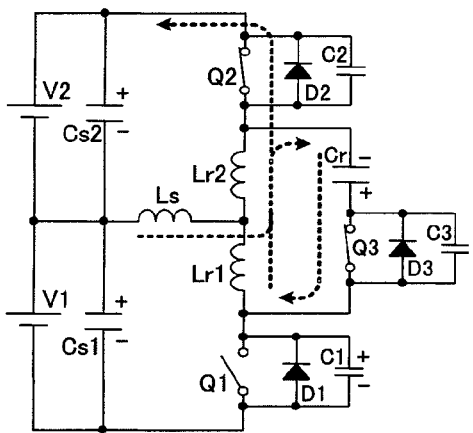
Figure 23C:
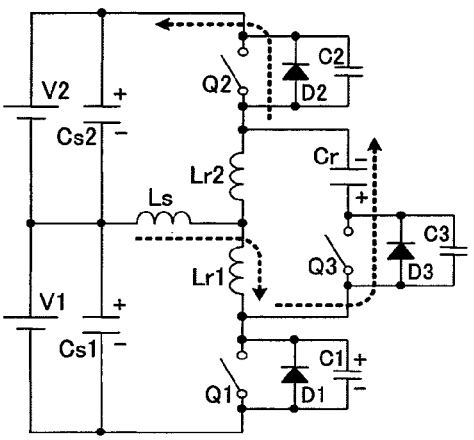
Figure 23F:
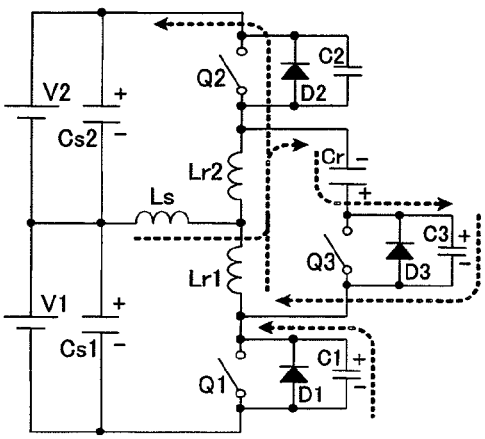
Figure 24G:
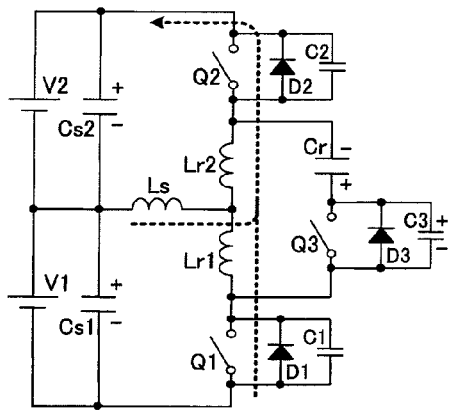
FIGS. 24G to 24L are also circuit diagrams, each of which illustrates an operation in which the bidirectional DC-DC converter in the twelfth embodiment of the present invention transfers energy in power supply V1 to power supply V2.
Figure 24J:
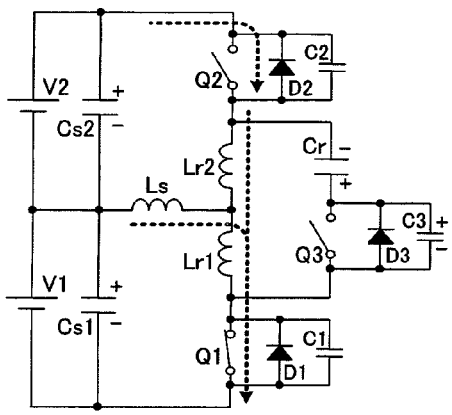
Figure 24H:
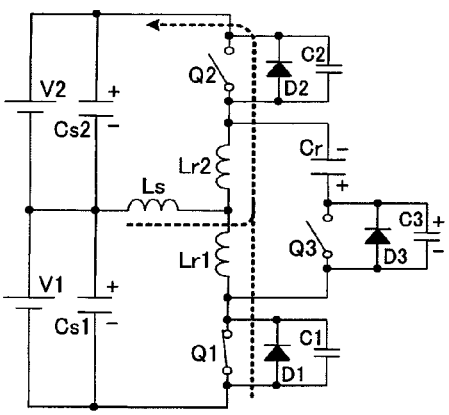
Figure 24K:
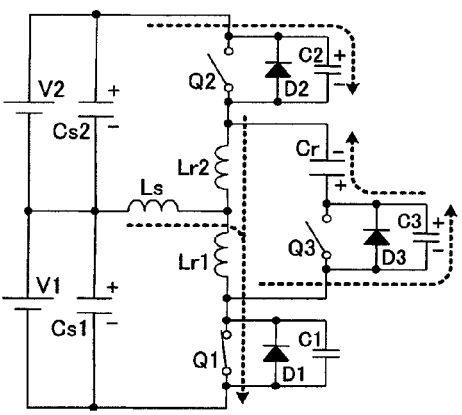
Figure 24I:
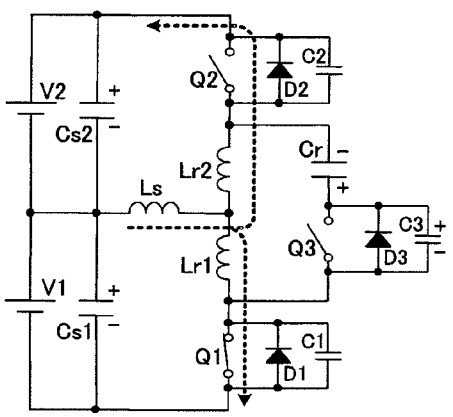
Figure 24L:
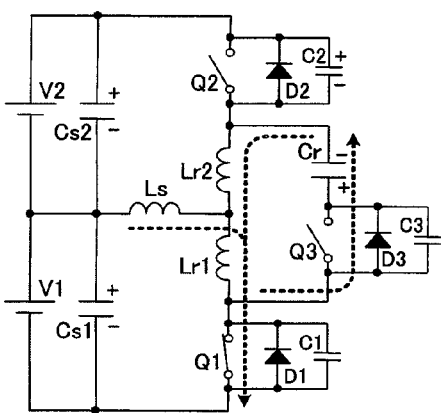
Figure 25A:
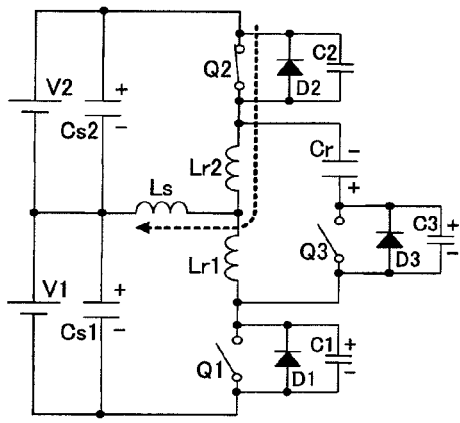
FIGS. 25A to 25F are circuit diagrams, each of which illustrates an operation in which the bidirectional DC-DC converter in the twelfth embodiment of the present invention transfers energy in power supply V2 to power supply V1.
Figure 25D:
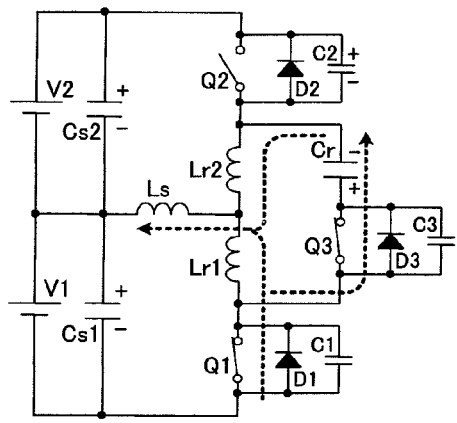
Figure 25B:
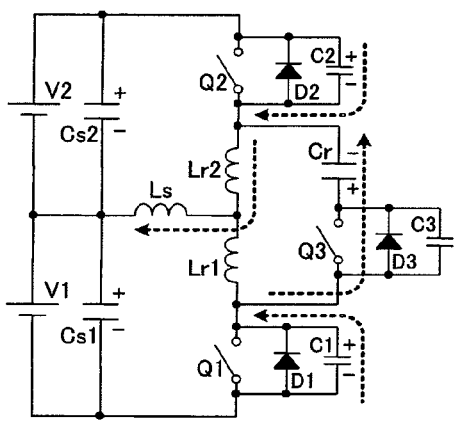
Figure 25E:
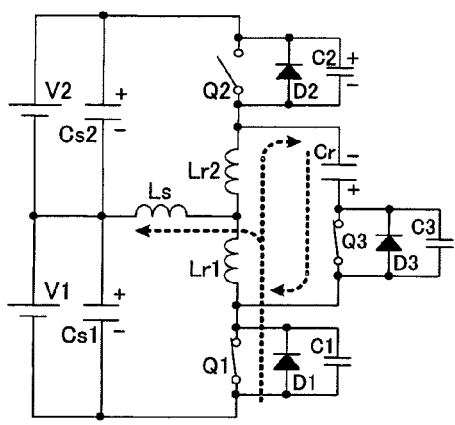
Figure 25C:
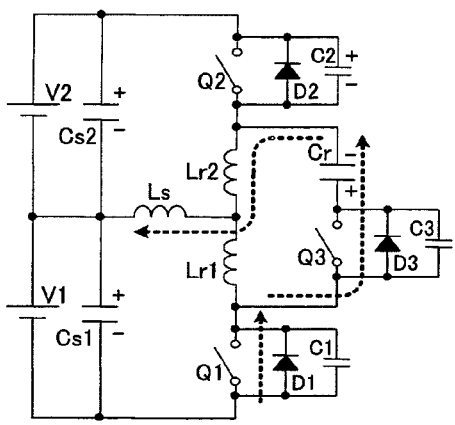
Figure 25F:
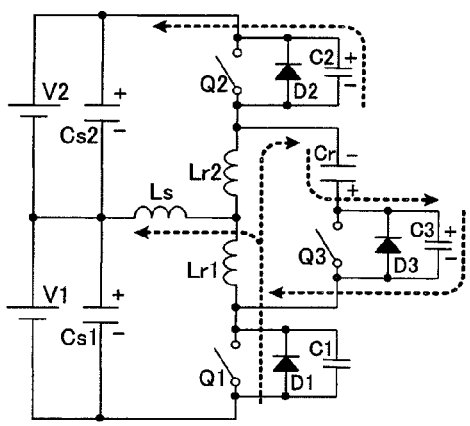
Figure 26G:
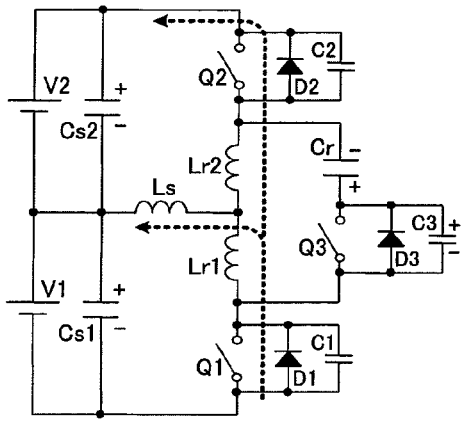
FIGS. 26G to 26L are also circuit diagrams, each of which illustrates an operation in which the bidirectional DC-DC converter in the twelfth embodiment of the present invention transfers energy in power supply V2 to power supply V1.
Figure 26J:
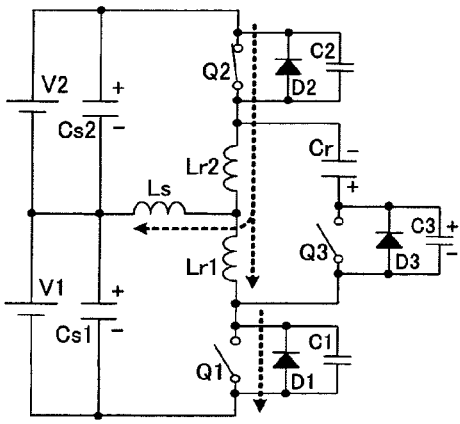
Figure 26H:
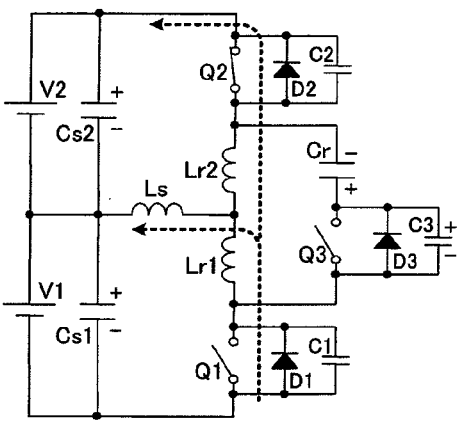
Figure 26K:
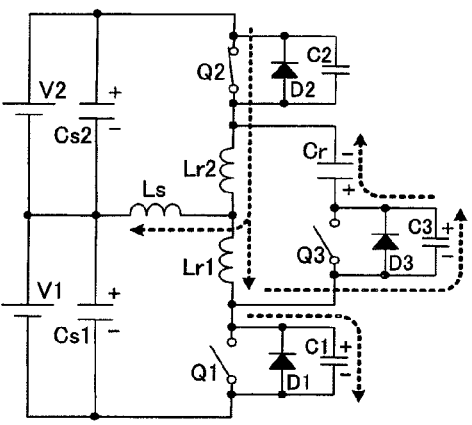
Figure 26I:
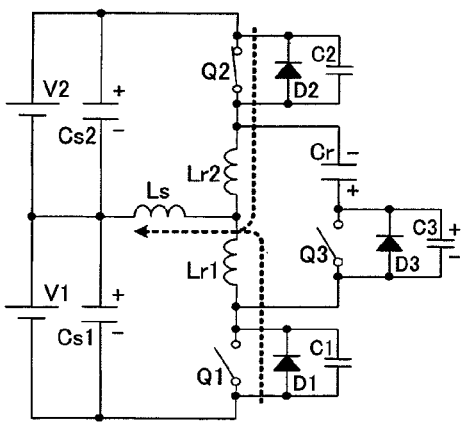
Figure 26L:
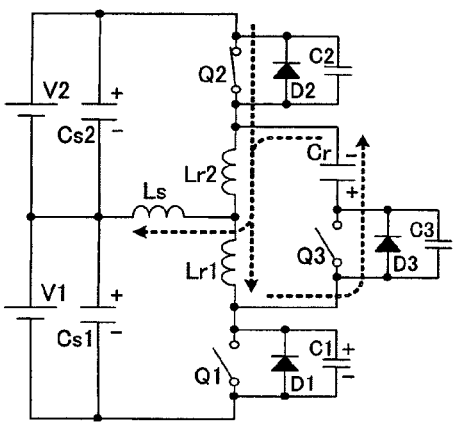

FIG. 22 shows a main circuit diagram of a bidirectional DC-DC converter 20 according to the twelfth embodiment of the present invention. A vertical arm is provided with smoothing capacitors Cs1 and Cs2; power supply V1 is connected in parallel to Cs1 and power supply V2 is connected in parallel to Cs2. Voltage conversion is performed between power supply V1 and power supply V2.

FIGS. 23A to 23F and FIGS. 24G to 24L are circuit diagrams, each of which illustrates an operation in which the bidirectional DC-DC converter in the twelfth embodiment of the present invention transfers energy in power supply V1 to power supply V2. FIGS. 25A to 25F and FIGS. 26G to 26L are circuit diagrams, each of which illustrates an operation in which the bidirectional DC-DC converter in the twelfth embodiment of the present invention transfers energy in power supply V2 to power supply V1. When a period in which both IGBTs Q1 and Q3 are turned off together is provided and they are turned on and off alternately, energy in power supply V1 is transferred to power supply V2. When a period in which both IGBTs Q2 and Q3 are turned off together is provided and they are turned on and off alternately, energy in power supply V2 is transferred to power supply V1. Other schemes in the control method are the same as in the bidirectional DC-DC converter 10 in the first embodiment. The waveforms at various parts in the circuit are the same as in FIGS. 4 and 7.

Resonant reactors Lr1 and Lr2 incorporated in the bidirectional DC-DC converter 20 in the twelfth embodiment in FIG. 22 may be magnetically coupled (not shown). The use of a common core increases the usage efficiency of the core and makes the core compact. Alternatively, either of resonant reactors Lr1 and Lr2 may be eliminated for compactness, as described in thirteenth and fourteenth embodiments below.

Thirteenth Embodiment

Figure 27:
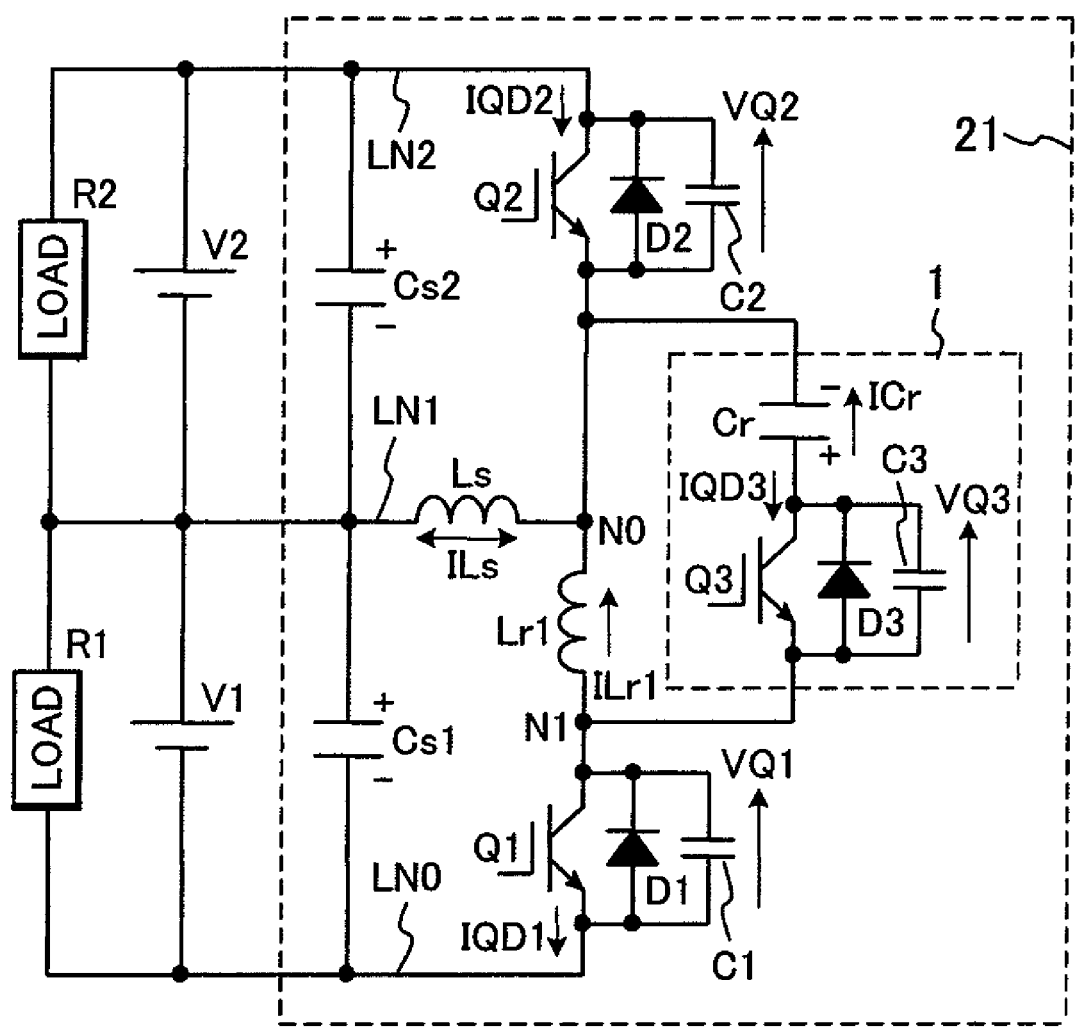
FIG. 27 shows a main circuit diagram of a bidirectional DC-DC converter according to a thirteenth embodiment of the present invention.

FIG. 27 shows a main circuit diagram of a bidirectional DC-DC converter according to a thirteenth embodiment of the present invention. The bidirectional DC-DC converter 21 in the thirteenth embodiment is structured by removing resonant reactor Lr2 from the bidirectional DC-DC converter 20 in the twelfth embodiment shown in FIG. 22 and restoring the connection. The circuit operations and control method are the same as with the bidirectional DC-DC converter 20 in the twelfth embodiment shown in FIG. 22. The waveforms at various parts in the circuit are the same as in FIGS. 4 and 7.

Fourteenth Embodiment

Figure 28:
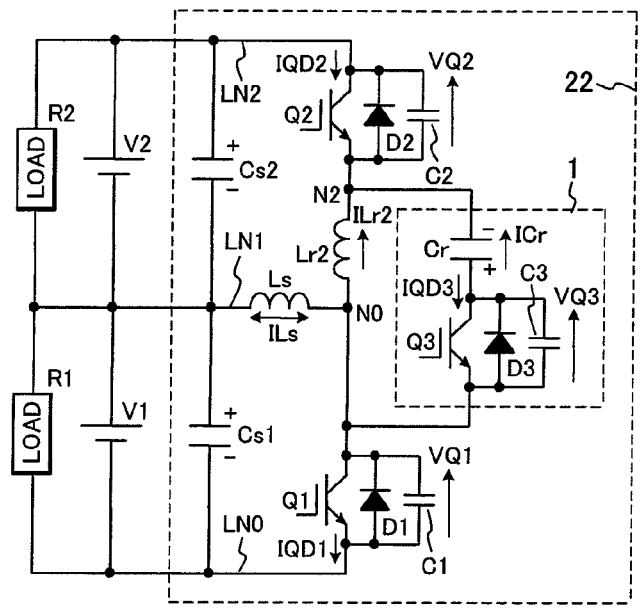
FIG. 28 shows a main circuit diagram of a bidirectional DC-DC converter according to a fourteenth embodiment of the present invention.

FIG. 28 shows a main circuit diagram of a bidirectional DC-DC converter according to a fourteenth embodiment of the present invention. The bidirectional DC-DC converter 22 in the fourteenth embodiment is structured by removing resonant reactor Lr1 from the bidirectional DC-DC converter 20 in the twelfth embodiment shown in FIG. 22 and restoring the connection. The circuit operations and control method are the same as with the bidirectional DC-DC converter 20 in the twelfth embodiment shown in FIG. 22. The waveforms at various parts in the circuit are the same as in FIGS. 4 and 7.

Fifteenth Embodiment

In the above-mentioned bidirectional DC-DC converter 20 in the twelfth embodiment in FIG. 22, IGBTs Q1 and Q2 are not interconnected, so an IGBT module in which a collector and emitter of two IGBTs are interconnected cannot be used. In the bidirectional DC-DC converter 23 in the fifteenth embodiment, therefore, its circuit connection is such that an IGBT module can be used.

Figure 29:
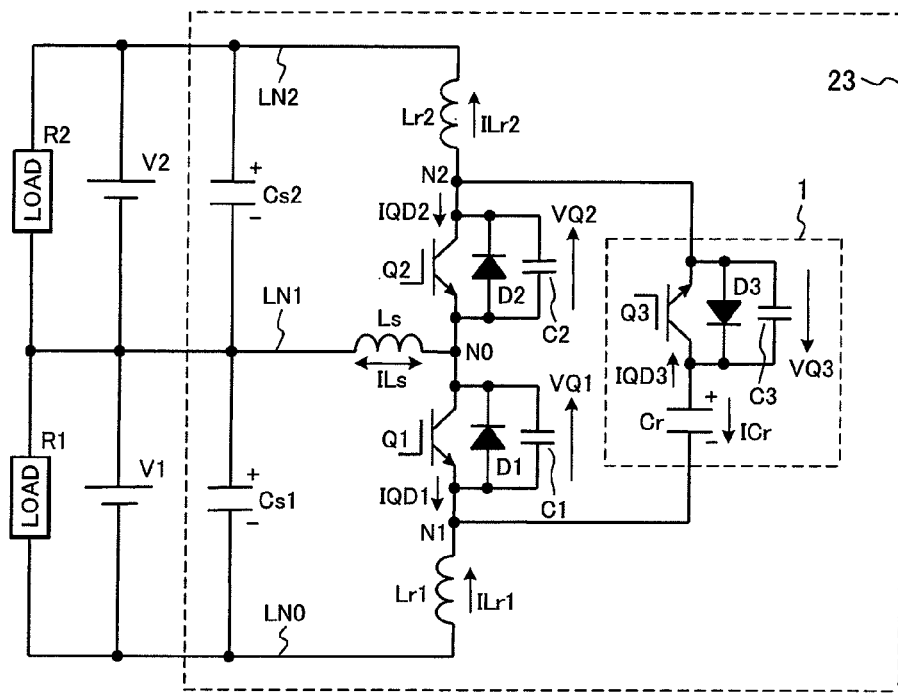
FIG. 29 shows a main circuit diagram of a bidirectional DC-DC converter according to a fifteenth embodiment of the present invention.
Figure 30A:
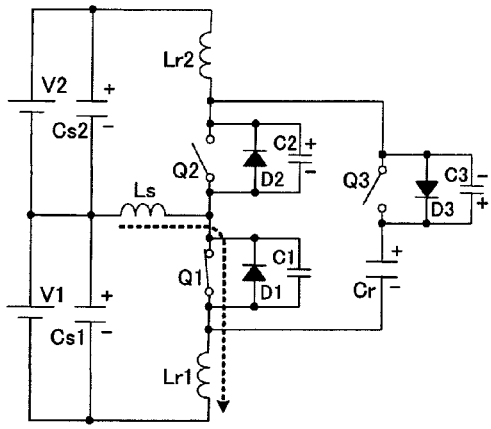
FIGS. 30A to 30F are circuit diagrams, each of which illustrates an operation in which the bidirectional DC-DC converter in the fifteenth embodiment of the present invention transfers energy in power supply V1 to power supply V2.
Figure 30D:
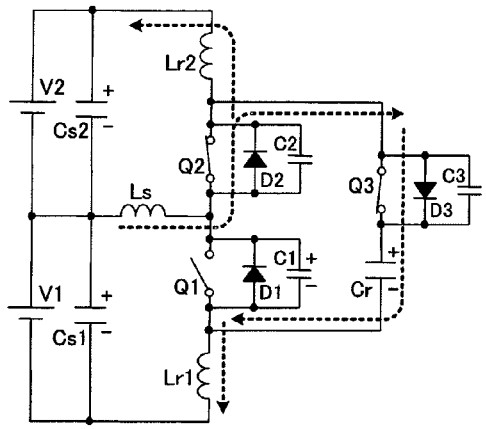
Figure 30B:
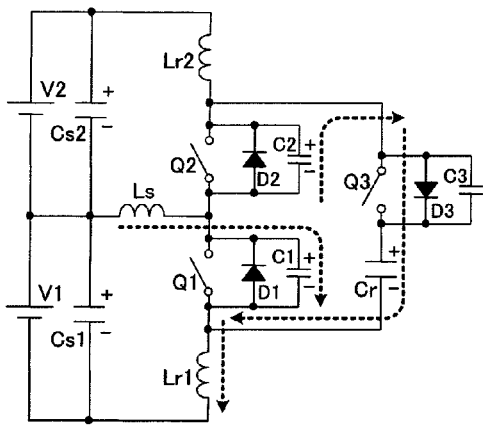
Figure 30E:
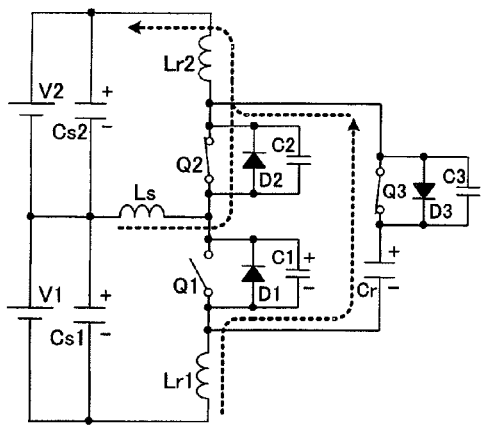
Figure 30C:
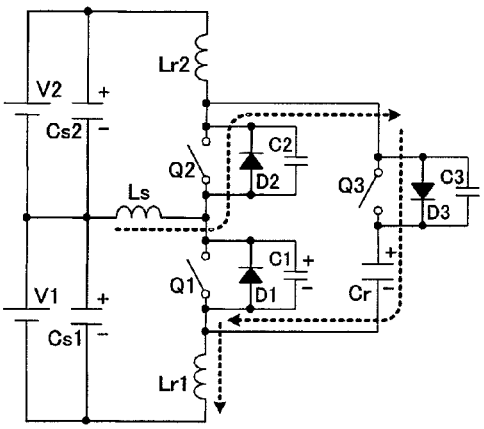
Figure 30F:
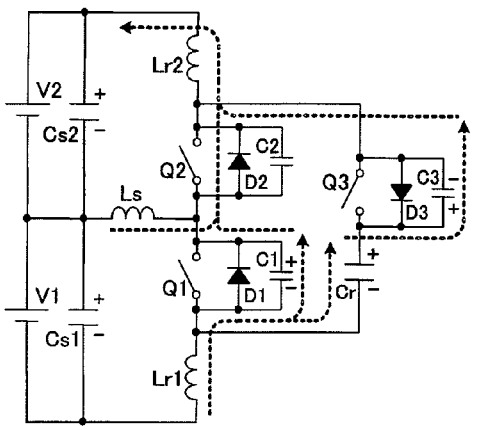
Figure 31G:
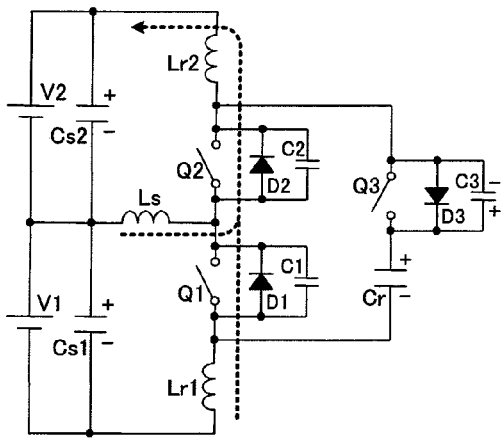
FIGS. 31G to 31L are also circuit diagrams, each of which illustrates an operation in which the bidirectional DC-DC converter in the fifteenth embodiment of the present invention transfers energy in power supply V1 to power supply V2.
Figure 31J:
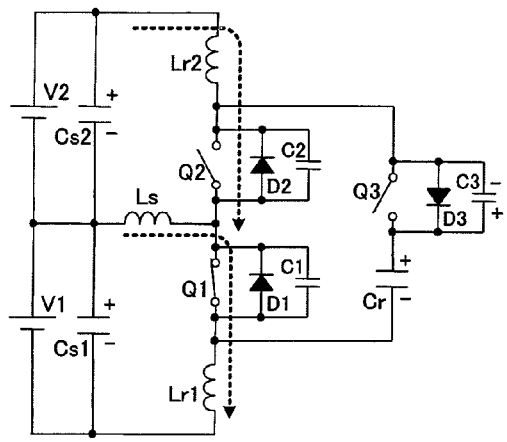
Figure 31H:
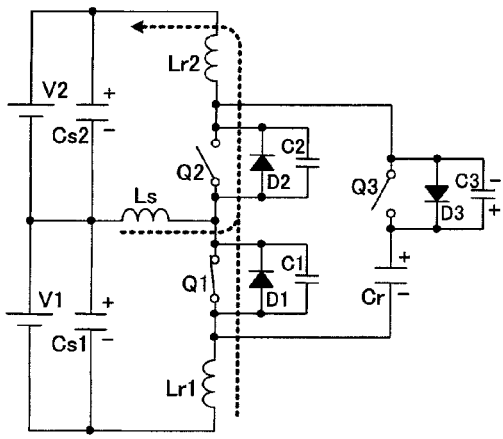
Figure 31K:
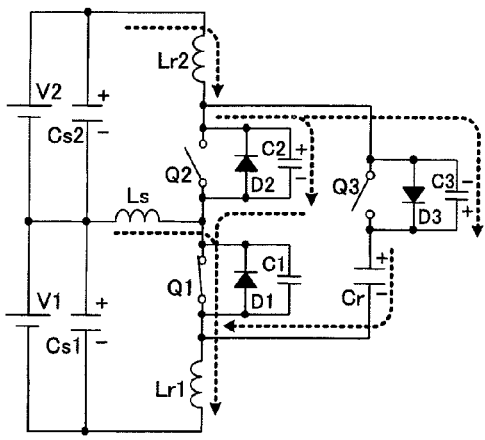
Figure 31I:
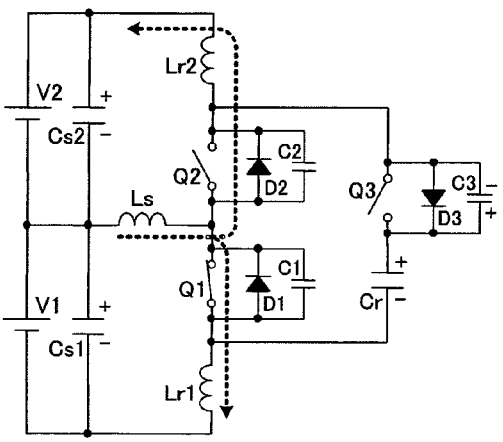
Figure 31L:
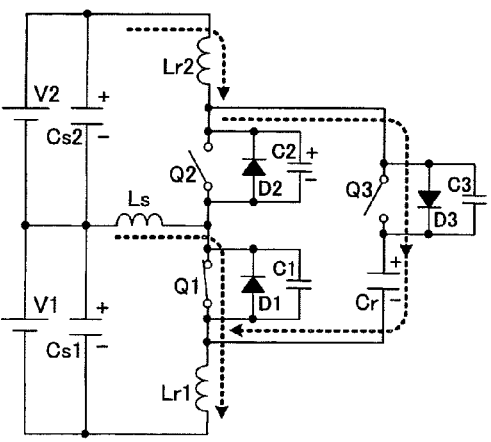
Figure 32A:
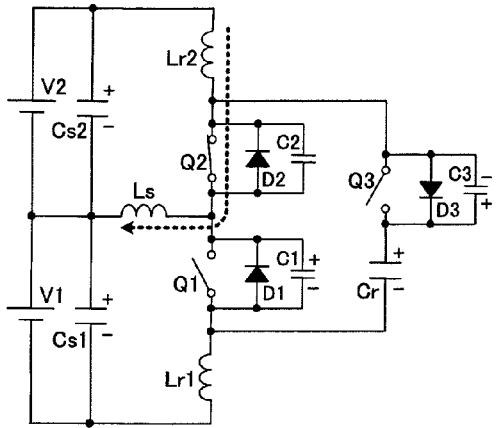
FIGS. 32A to 32F are circuit diagrams, each of which illustrates an operation in which the bidirectional DC-DC converter in the fifteenth embodiment of the present invention transfers energy in power supply V2 to power supply V1.
Figure 32D:
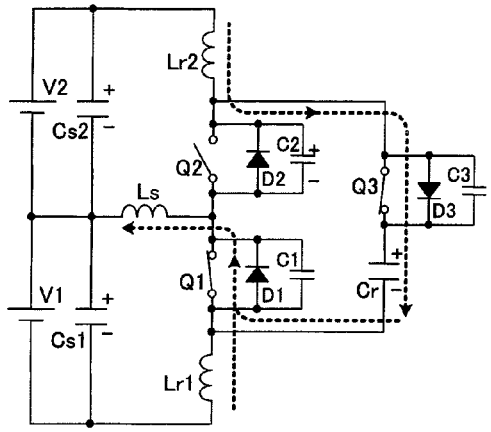
Figure 32B:
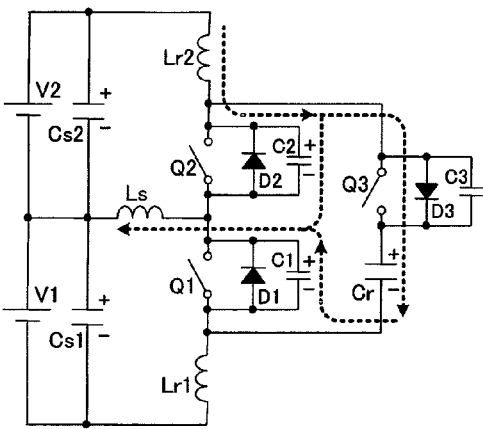
Figure 32E:
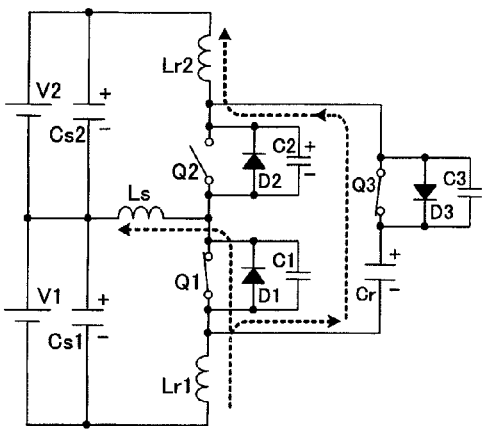
Figure 32C:
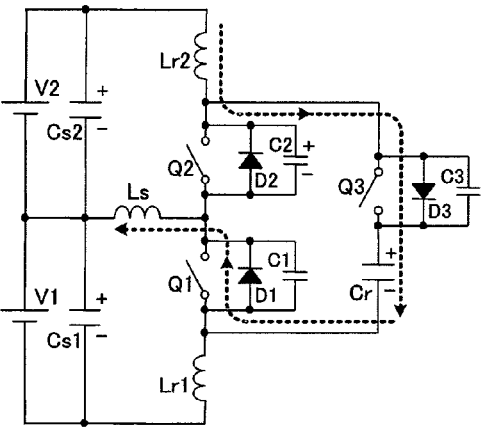
Figure 32F:
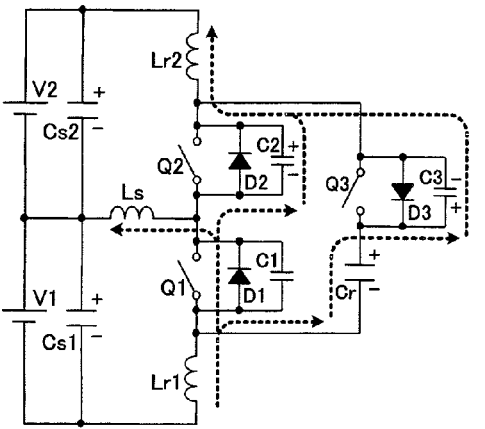
Figure 33G:
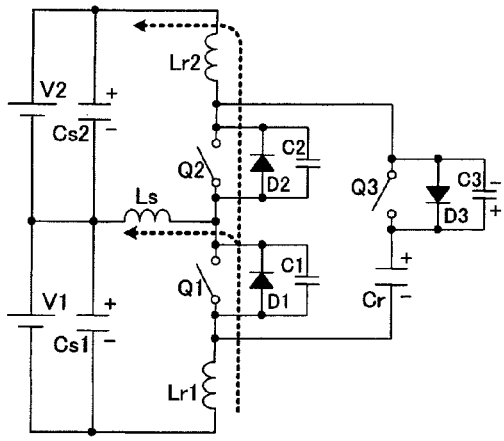
FIGS. 33G to 33L are also circuit diagrams, each of which illustrates an operation in which the bidirectional DC-DC converter in the fifteenth embodiment of the present invention transfers energy in power supply V2 to power supply V1.
Figure 33J:
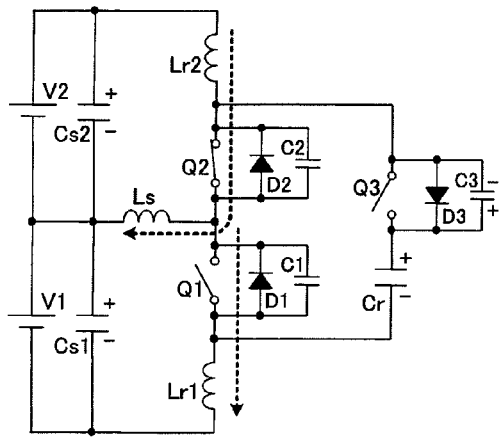
Figure 33H:
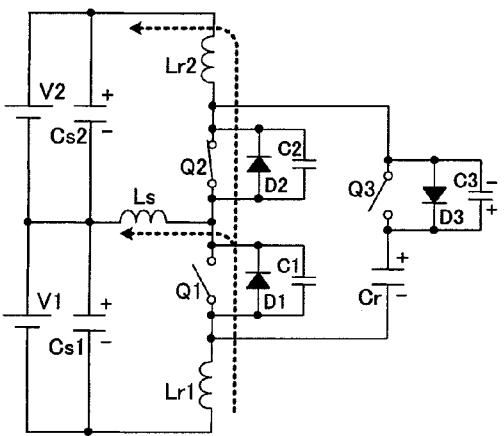
Figure 33K:
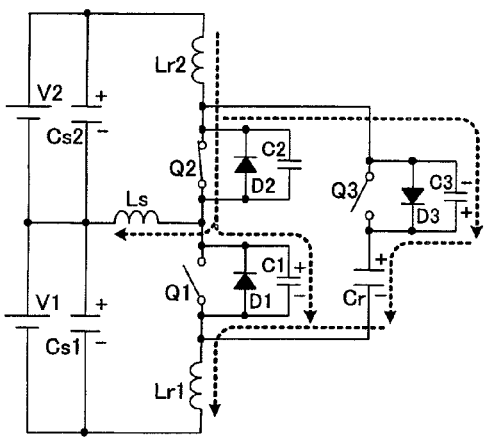
Figure 33I:
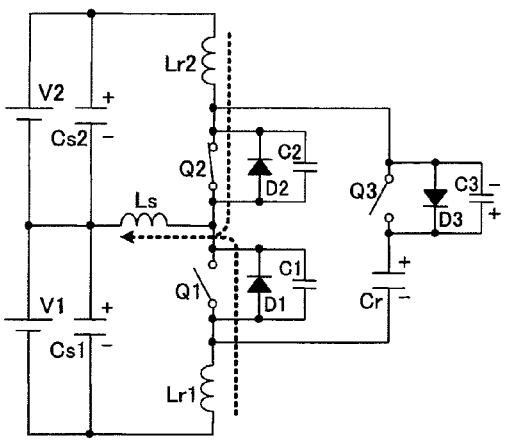
Figure 33L:
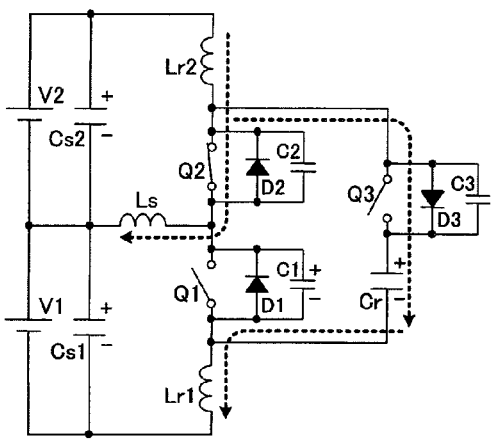

FIG. 29 shows a main circuit diagram of a bidirectional DC-DC converter according to a fifteenth embodiment of the present invention. In the bidirectional DC-DC converter 23 in the fifteenth embodiment, first IGBT Q1 and resonant reactor Lr1 in FIG. 22 are mutually exchanged and second IGBT Q2 and resonant reactor Lr2 also in FIG. 22 are mutually exchanged; the circuit elements are the same as in FIG. 22.

Only differences from FIG. 22 will be described. The collector of IGBT Q1 and the emitter of IGBT Q2 are connected to node N0. Resonant reactor Lr1 is connected between the emitter of IGBT Q1 and negative bus LN0, and resonant reactor Lr2 is connected between the collector of IGBT Q2 and positive bus LN2. The connection point between IGBT Q1 and resonant reactor Lr1 is called node N1, and the connection point between IGBT Q2 and resonant reactor Lr2 is called node N2. IGBT Q3 and a resonant capacitor Cr are interconnected in series to form an active resonant circuit. Another active resonant circuit is formed between node N1 and node N2 in such a way that the emitter of IGBT Q3 faces node N2.

Symbols representing the voltages and currents in the circuit diagram in FIG. 29 will be defined. Current ILr1 flowing in resonant reactor Lr1 is positive when it flows from negative bus LN0 to node N1, and current ILr2 flowing in resonant reactor Lr2 is positive when it flows from node N2 to positive bus LN2. The definitions of the symbols for the other voltages and currents are the same as for the bidirectional DC-DC converter 20 in the twelfth embodiment in FIG. 22.

FIGS. 30A to 30F and FIGS. 31G to 31L are circuit diagrams, each of which illustrates an operation in which the bidirectional DC-DC converter in the fifteenth embodiment of the present invention transfers energy in power supply V1 to power supply V2. FIGS. 32A to 32F and FIGS. 33G to 33L are circuit diagrams, each of which illustrates an operation in which the bidirectional DC-DC converter in the fifteenth embodiment of the present invention transfers energy in power supply V2 to power supply V1. The control method is the same as in the bidirectional DC-DC converter 20 in the twelfth embodiment. The waveforms at various parts in the circuit are the same as in FIGS. 4 and 7.

Resonant reactors Lr1 and Lr2 incorporated in the bidirectional DC-DC converter 23 in the fifteenth embodiment may be magnetically coupled (not shown). The use of a common core increases the usage efficiency of the core and makes the core compact. Alternatively, either of resonant reactors Lr1 and Lr2 may be eliminated for compactness, as described in a sixteenth embodiment (FIG. 34) to a twenty-first embodiment (FIG. 39) below.

Sixteenth Embodiment

Figure 34:
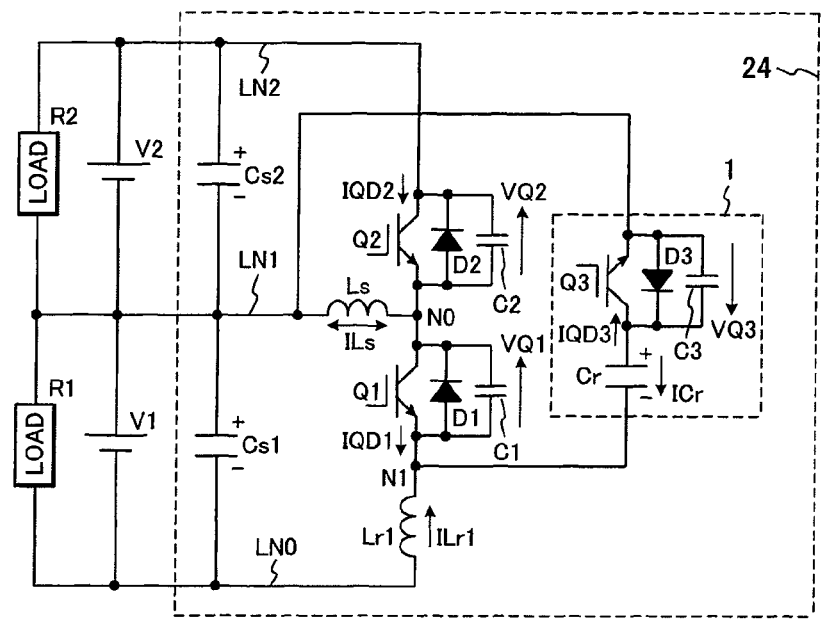
FIG. 34 shows a main circuit diagram of a bidirectional DC-DC converter according to a sixteenth embodiment of the present invention.

FIG. 34 shows a main circuit diagram of a bidirectional DC-DC converter according to a sixteenth embodiment of the present invention.

The bidirectional DC-DC converter 24 in the sixteenth embodiment is structured by removing resonant reactor Lr2 from the bidirectional DC-DC converter 23 in the fifteenth embodiment in FIG. 29 and restoring the connection and by disconnecting one end of the active resonant circuit from node N2 and reconnecting it to positive bus line LN1.

The circuit operations and control method are the same as with the bidirectional DC-DC converter 23 in the fifteenth embodiment shown in FIG. 29. The waveforms at various parts in the circuit are the same as in FIGS. 4 and 7.

Seventeenth Embodiment

Figure 35:
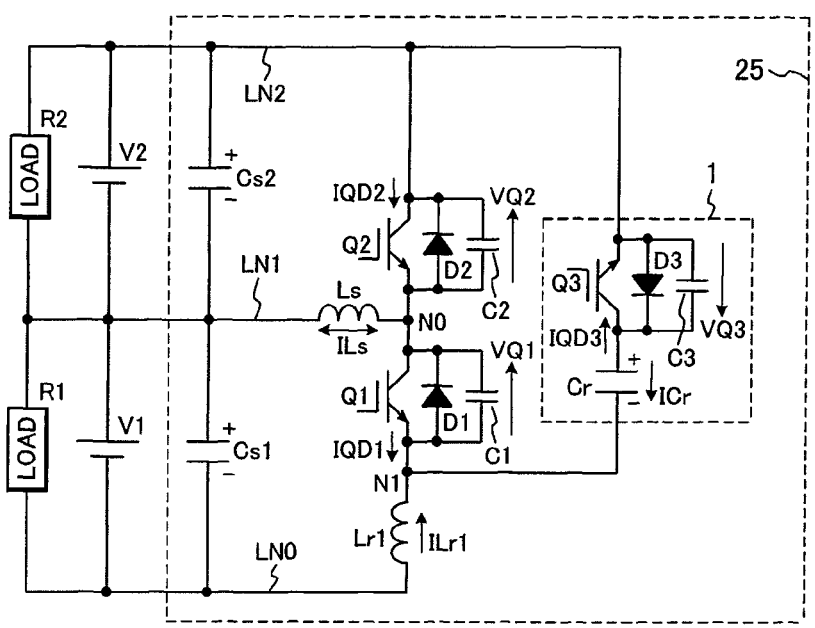
FIG. 35 shows a main circuit diagram of a bidirectional DC-DC converter according to a seventeenth embodiment of the present invention.

FIG. 35 shows a main circuit diagram of a bidirectional DC-DC converter according to a seventeenth embodiment of the present invention. The bidirectional DC-DC converter 25 in the seventeenth embodiment is structured by removing resonant reactor Lr2 from the bidirectional DC-DC converter 23 in the fifteenth embodiment in FIG. 29 and restoring the connection and by disconnecting one end of the active resonant circuit from node N2 and reconnecting it to positive bus line LN2.

The circuit operations and control method are the same as with the bidirectional DC-DC converter 23 in the fifteenth embodiment. The waveforms at various parts in the circuit are the same as in FIGS. 4 and 7.

Eighteenth Embodiment

Figure 36:
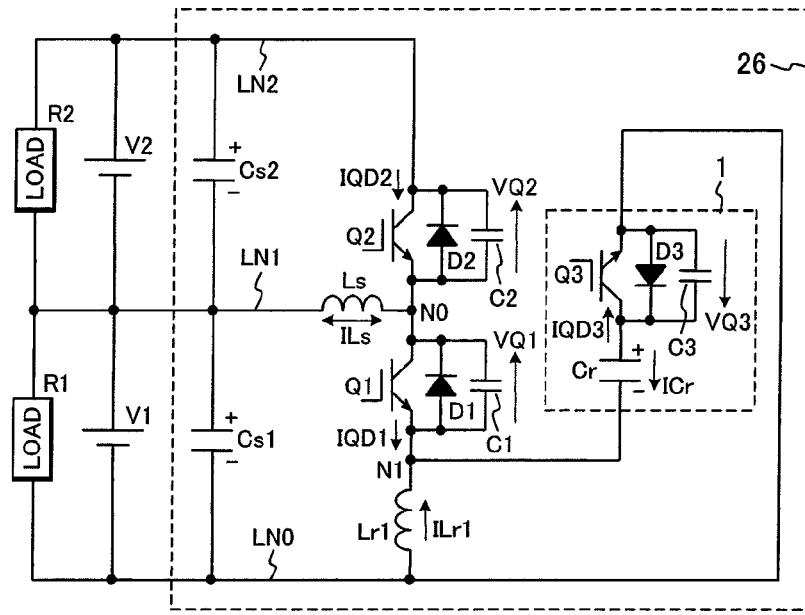
FIG. 36 shows a main circuit diagram of a bidirectional DC-DC converter according to an eighteenth embodiment of the present invention.

FIG. 36 shows a main circuit diagram of a bidirectional DC-DC converter according to an eighteenth embodiment of the present invention. The bidirectional DC-DC converter 26 in the eighteenth embodiment is structured by removing resonant reactor Lr2 from the bidirectional DC-DC converter 23 in the fifteenth embodiment in FIG. 29 and restoring the connection and by disconnecting one end of the active resonant circuit from node N2 and reconnecting it to negative bus line LN0.

The circuit operations and control method are the same as with the bidirectional DC-DC converter 23 in the fifteenth embodiment. The waveforms at various parts in the circuit are the same as in FIGS. 4 and 7.

Nineteenth Embodiment

Figure 37:
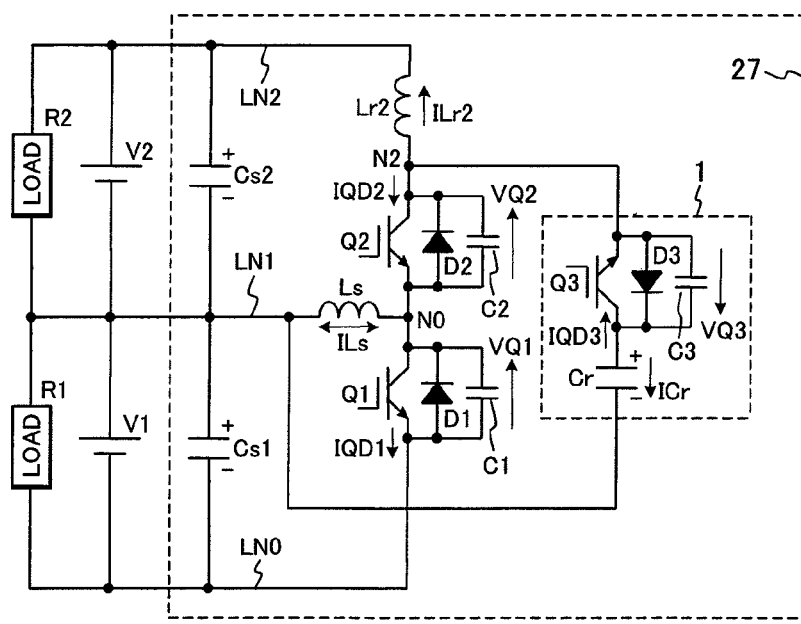
FIG. 37 shows a main circuit diagram of a bidirectional DC-DC converter according to a nineteenth embodiment of the present invention.

FIG. 37 shows a main circuit diagram of a bidirectional DC-DC converter according to a nineteenth embodiment of the present invention. The bidirectional DC-DC converter 27 in the nineteenth embodiment is structured by removing resonant reactor Lr1 from the bidirectional DC-DC converter 23 in the fifteenth embodiment in FIG. 29 and restoring the connection and by disconnecting one end of the active resonant circuit from node N1 and reconnecting it to positive bus line LN1.

The circuit operations and control method are the same as with the bidirectional DC-DC converter 23 in the fifteenth embodiment. The waveforms at various parts in the circuit are the same as in FIGS. 4 and 7.

Twentieth Embodiment

Figure 38:
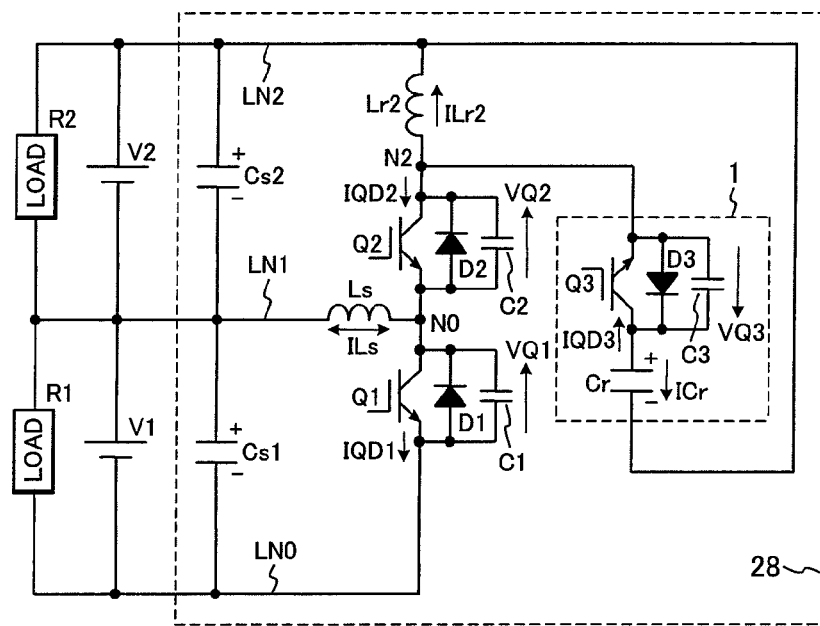
FIG. 38 shows a main circuit diagram of a bidirectional DC-DC converter according to a twentieth embodiment of the present invention.

FIG. 38 shows a main circuit diagram of a bidirectional DC-DC converter according to a twentieth embodiment of the present invention. The bidirectional DC-DC converter 28 in the twentieth embodiment is structured by removing resonant reactor Lr1 from the bidirectional DC-DC converter 23 in the fifteenth embodiment in FIG. 29 and restoring the connection and by disconnecting one end of the active resonant circuit from node N1 and reconnecting it to positive bus line LN2.

The circuit operations and control method are the same as with the bidirectional DC-DC converter 23 in the fifteenth embodiment. The waveforms at various parts in the circuit are the same as in FIGS. 4 and 7.

Twenty-First Embodiment

Figure 39:
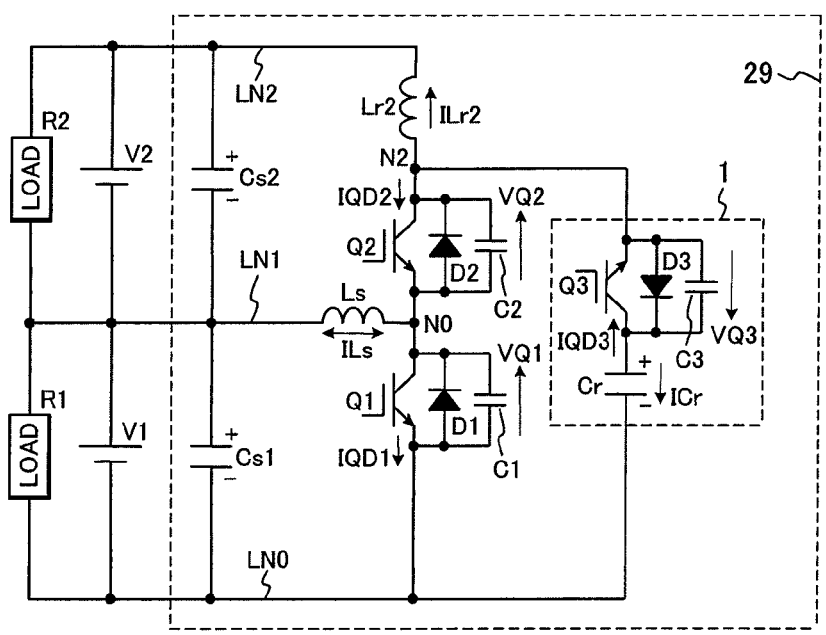
FIG. 39 shows a main circuit diagram of a bidirectional DC-DC converter according to a twenty-first embodiment of the present invention.

FIG. 39 shows a main circuit diagram of a bidirectional DC-DC converter according to a twenty-first embodiment of the present invention. The bidirectional DC-DC converter 29 in the twenty-first embodiment is structured by removing resonant reactor Lr1 from the bidirectional DC-DC converter 23 in the fifteenth embodiment in FIG. 29 and restoring the connection and by disconnecting one end of the active resonant circuit from node N1 and reconnecting it to negative bus line LN0.

The circuit operations and control method are the same as with the bidirectional DC-DC converter 23 in the fifteenth embodiment. The waveforms at various parts in the circuit are the same as in FIGS. 4 and 7.

So far, bidirectional DC-DC converters in 21 different embodiments of the present invention have been described. Next, exemplary applications, in which any one of a variety of these embodiments can be used, will be described.

Figure 40:
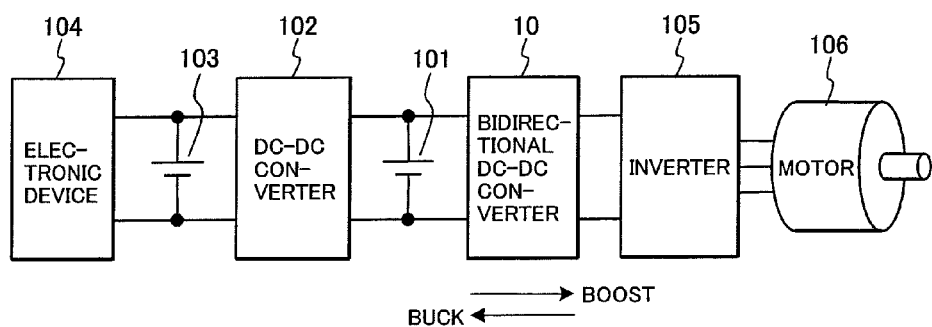
FIG. 40 shows the general structure of a power supply apparatus in a hybrid vehicle, a bidirectional DC-DC converter according to the present invention being used in the power supply apparatus.

FIG. 40 shows the general structure of a power supply apparatus in a hybrid vehicle, a bidirectional DC-DC converter according to the present invention being used in the power supply apparatus. One end of the bidirectional DC-DC converter 10 is connected to an inverter 105 connected to a motor 106, and the other end is connected to a DC power supply 101. The DC power supply 101 is connected to a DC-DC converter 102, to which another DC power supply 103 supplying a voltage lower than the voltage of the DC power supply 101 is connected. Energy is transferred and received between the DC power supplies 101 and 103. The power supply 103 is connected to, for example, an electronic device 104 operating on 14 V.

When the inverter 105 powers the motor 106, the bidirectional DC-DC converter 10 boosts the voltage of the DC power supply 101 and supplies its energy to the inverter 105. When the inverter 105 causes the motor 106 to regenerate electric power, the bidirectional DC-DC converter 10 drops the voltage of the inverter 105 and supplies regenerative energy to the DC power supply 101. The DC power supply 101 may be a capacitor.

Figure 41:
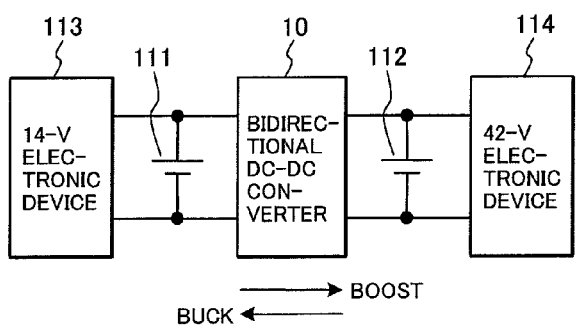
FIG. 41 shows the general structure of a power supply apparatus in a vehicle, a bidirectional DC-DC converter according to the present invention being used in the power supply apparatus.

FIG. 41 shows the general structure of a power supply apparatus in a vehicle, a bidirectional DC-DC converter according to the present invention being used in the power supply apparatus. The bidirectional DC-DC converter 10 is connected between a DC power supply 111 for supplying energy to an electronic device 113 operating on 14 V and another DC power supply 112 for supplying electric power to an electronic device 114 operating on 42 V. When energy is supplied from the DC power supply 111 to the DC power supply 112, a boost operation is performed. When energy is supplied from the DC power supply 112 to the DC power supply 111, a buck operation is performed.

Figure 42:
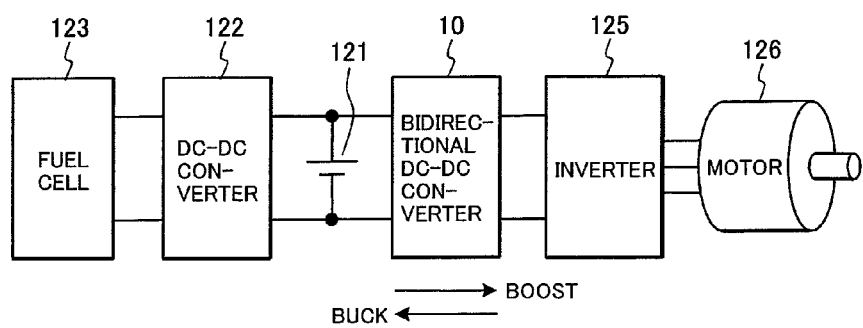
FIG. 42 shows the general structure of a power supply apparatus in a fuel cell-powered vehicle, a bidirectional DC-DC converter according to the present invention being used in the power supply apparatus.

FIG. 42 shows the general structure of a power supply apparatus in a fuel cell-powered vehicle, a bidirectional DC-DC converter according to the present invention being used in the power supply apparatus. One end of the bidirectional DC-DC converter 10 is connected to an inverter 125 connected to a motor 126, and the other end is connected to a DC power supply 121. The DC power supply 121 is connected to a DC-DC converter 122, to which a fuel cell 123 is connected; the DC-DC converter 122 converts the voltage of the fuel cell 123 and supplies its energy to the DC power supply 121.

This structure enables the energy of the fuel cell 123 to be stored in the DC power supply 121. When the inverter 125 powers the motor 126, the bidirectional DC-DC converter 10 boosts the voltage of the DC power supply 121 and supplies its energy to the inverter 125. When the inverter 125 causes the motor 126 to regenerate electric power, the bidirectional DC-DC converter 10 drops the voltage of the inverter 125 and supplies regenerative energy to the DC power supply 121. The DC power supply 121 may be a capacitor.

According to the embodiments in FIGS. 40 to 42, a bidirectional DC-DC converter in the present invention can be used to increase its conversion efficiency and make it lightweight, so an increase in mileage and improvement in running performance can be achieved. Since the DC-DC converter can also be made compact, the degree of freedom in vehicle design increases, enabling various types of vehicle structures to be designed.

Figure 43:
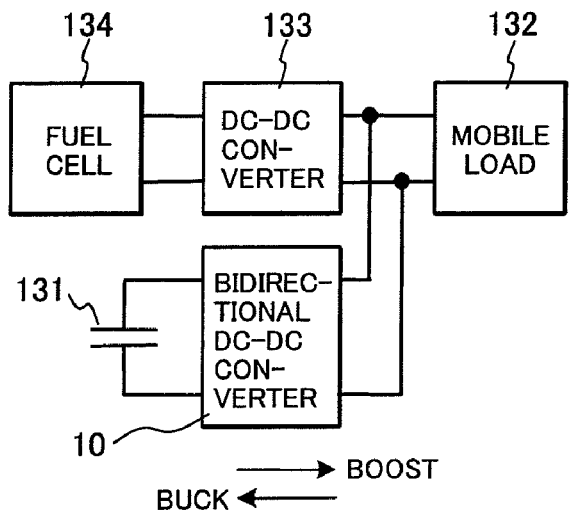
FIG. 43 shows the general structure of a power supply apparatus in a mobile unit, a bidirectional DC-DC converter according to the present invention being used in the power supply apparatus, a fuel cell being provided as a power supply.

FIG. 43 shows the general structure of a power supply apparatus in a mobile unit, a bidirectional DC-DC converter according to the present invention being used in the power supply apparatus, a fuel cell being provided as a power supply. A DC-DC converter 133 converts the voltage of the fuel cell 134 and supplies its energy to a mobile load 132. One end of the bidirectional DC-DC converter 10 is connected to a capacitor 131, and the other end is connected to the mobile load 132. This structure enables the mobile load to receive energy from the fuel cell 134, the capacitor 131, or both. It is also possible to store the energy of the fuel cell 134 in the capacitor 131. A DC power supply may be used instead of the capacitor 131. A system in which the fuel cell 134 is replaced with a solar cell may also be possible.

According to this embodiment, the use of the inventive bidirectional DC-DC converter increases the conversion efficiency, thereby prolonging a continuous operation time. An increase in conversion efficiency also enables the electricity storage unit to be made compact and lightweight. Since the DC-DC converter can be made compact and lightweight, a compact, lightweight mobile unit can be achieved.

Figure 44:
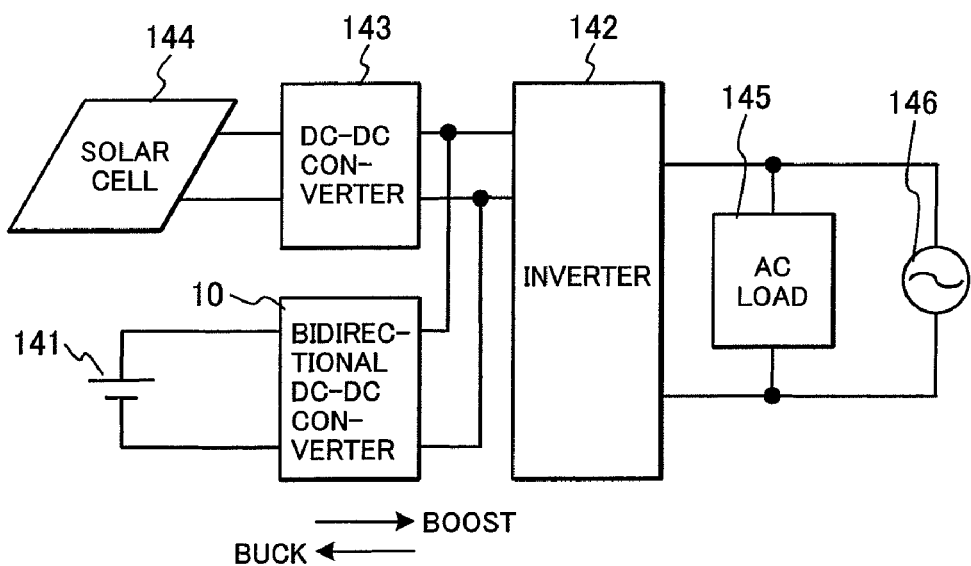
FIG. 44 shows the general structure of a power supply apparatus in a grid-connected photovoltaic generation system, a bidirectional DC-DC converter according to the present invention and an electricity storage unit being used in the power supply apparatus.

FIG. 44 shows the general structure of a power supply apparatus in a grid-connected photovoltaic generation system, a bidirectional DC-DC converter according to the present invention and an electricity storage unit being used in the power supply apparatus. A DC-DC converter 143 converts the voltage of a solar cell 144 and supplies its energy to the DC side of an inverter 142. One end of the bidirectional DC-DC converter 10 is connected to a DC power supply 141, and the other end is connected to the DC side of the inverter 142. The AC side of the inverter 142 is connected to an AC load 145, such as a home electric appliance, and an AC power supply system 146.

This structure enables the AC load 145 and AC power supply system 146 to receive energy from the solar cell 144, the DC power supply 141, or both. It is also possible to store the energy of the solar cell 144 in the DC power supply 141. Furthermore, it is also possible to store energy from the AC power supply system 146 into the DC power supply 141. A capacitor may be used instead of the DC power supply 141. A system in which the solar cell 144 is replaced with a fuel cell may be possible.

According to this embodiment, the use of the inventive bidirectional DC-DC converter increases the conversion efficiency, thereby reducing light and fuel expenses, carbon dioxide emission, and primary energy supply as well as making the electricity storage unit compact. Furthermore, an amount to absorb variations in power is assured and noise is reduced, making a contribution to providing quality electric power.

Figure 45:
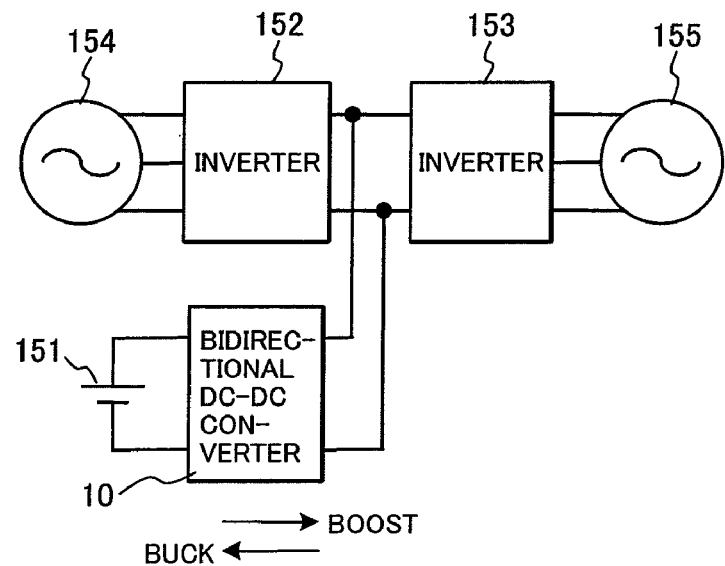
FIG. 45 shows the general structure of a power supply apparatus in a loop controller, a bidirectional DC-DC converter according to the present invention and an electricity storage unit being used in the power supply apparatus.

FIG. 45 shows the general structure of a power supply apparatus in a loop controller, a bidirectional DC-DC converter according to the present invention and an electricity storage unit being used in the power supply apparatus. The AC side of an inverter 152 is connected to a power system 154; the AC side of an inverter 153 is connected to another power system 155. The DC sides of the inverters 152 and 153 are mutually connected. The inverters 152 and 153 transfer and receive energy between the power systems 154 and 155. One end of the bidirectional DC-DC converter 10 is connected to a DC power supply 151, and the other end is connected to the DC sides of the inverters 152 and 153.

This structure enables energy to be stored in the DC power supply 151 from the power supply system 154, the power supply system 155, or both. The structure also enables the DC power supply 151 to supply its energy to the power supply system 154, the power supply system 155, or both. A capacitor may be used instead of the DC power supply 151. This type of loop controller has functions for controlling power flow of power systems and storing energy, by which the power quality of the power systems is improved and the load ratio is increased.

According to this embodiment, the use of the inventive bidirectional DC-DC converter increases the conversion efficiency, thereby reducing carbon dioxide emission and primary energy supply as well as making the electricity storage unit compact. Furthermore, an amount to deliver electricity and an amount to absorb variations in power are assured and noise is reduced, making a contribution to providing quality power.

Figure 46:
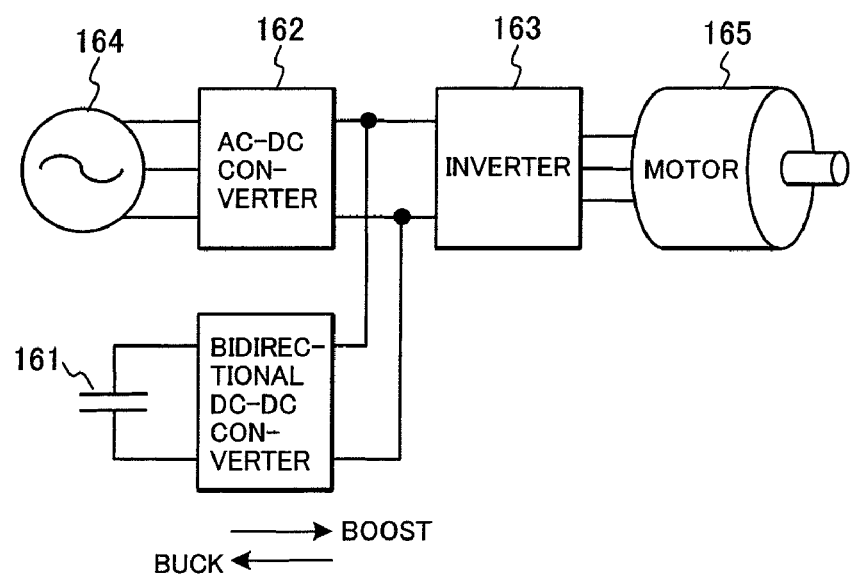
FIG. 46 shows the general structure of a power supply apparatus for an elevator, a bidirectional DC-DC converter according to the present invention and an electricity storage unit being used in the power supply apparatus.

FIG. 46 shows the general structure of a power supply apparatus for an elevator, a bidirectional DC-DC converter according to the present invention and an electricity storage unit being used in the power supply apparatus. An AC-DC converter 162 rectifies the voltage of an AC power supply 164, and supplies its energy to an inverter 163 connected to a motor 165. One end of the bidirectional DC-DC converter 10 is connected to a capacitor 161, and the other is connected to the DC side of the AC-DC converter 162.

This structure enables the inverter 163 to receive energy from the AC power supply 164, the capacitor 161, or both so as to power the motor 165. It is also possible to store in the capacitor 161 energy obtained when the inverter 163 causes the motor 165 to regenerate electric power. A DC power supply may be used instead of the capacitor 161.

According to this embodiment, the use of the inventive bidirectional DC-DC converter increases the conversion efficiency, thereby reducing carbon dioxide emission and primary energy supply as well as making the electricity storage unit compact. Furthermore, an amount to absorb variations in power is assured and noise is reduced, making a contribution to providing quality power.

Figure 47:
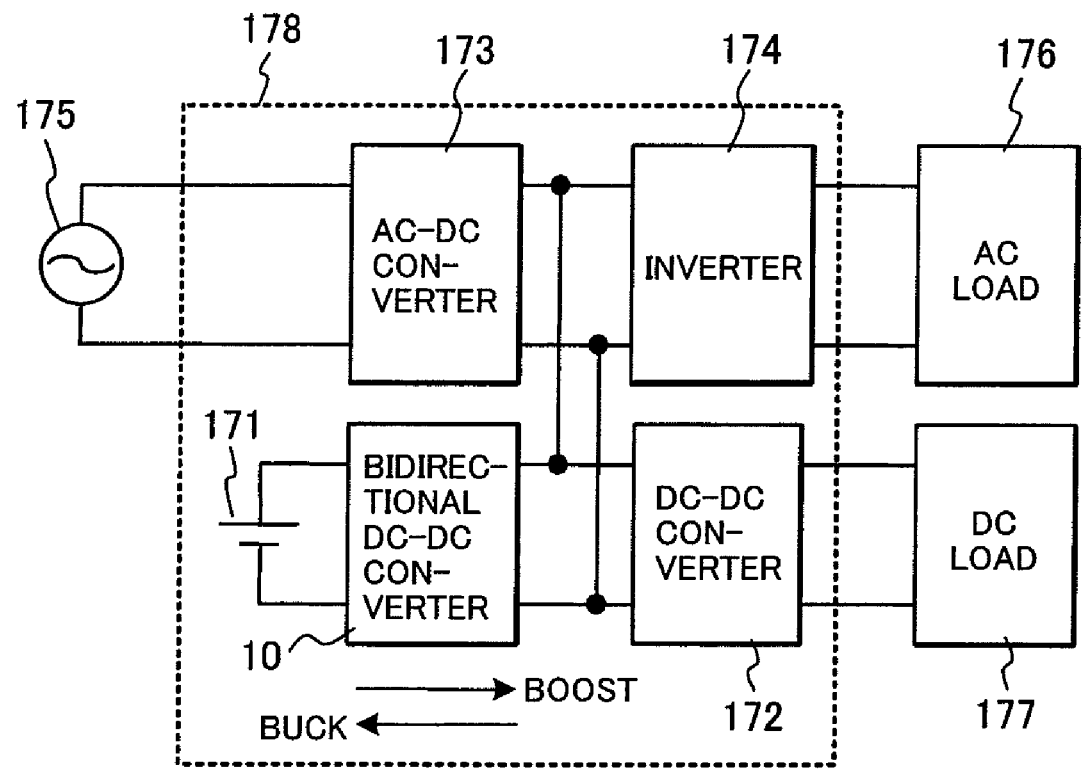
FIG. 47 shows the general structure of an uninterruptible power supply in which a bidirectional DC-DC converter according to the present invention is used.

FIG. 47 shows the general structure of an uninterruptible power supply in which a bidirectional DC-DC converter according to the present invention is used. The uninterruptible power supply 178 comprises a bidirectional DC-DC converter 10, a DC power supply 171, a DC-DC converter 172, an AC-DC converter 173, and an inverter 174. The AC-DC converter 173 rectifies the voltage of an AC power supply 175 and supplies its energy to the DC-DC converter 172 and the inverter 174. The DC-DC converter 172 supplies energy to a DC load 177, and the inverter 174 supplies energy to an AC load 176. One end of the bidirectional DC-DC converter 10 is connected to a DC power supply 171, and the other end is connected to the DC side of the AC-DC converter 173.

In this structure, when power of the AC power supply 175 fails or its voltage drops for an instant, the bidirectional DC-DC converter 10 operates, so the energy of the DC power supply 171 can be supplied to the DC-DC converter 172 and the inverter 174. Energy supply to the DC load 177 and AC load 176 can also be continued. When the AC power supply 175 recovers, the energy of the AC power supply 175, resulting from voltage rectification by the AC-DC converter 173, is stored in the DC power supply 171. A capacitor may be used instead of the DC power supply 171.

According to this embodiment, the use of the inventive bidirectional DC-DC converter increases the conversion efficiency, thereby making the electricity storage unit compact and prolonging a power supply time during an outage.

What is claimed is:

1. A bidirectional DC-DC converter including a first smoothing capacitor connected in parallel to a first power supply, a second smoothing capacitor connected in parallel to a second power supply, a first switching device, a second switching device, a smoothing reactor, and a control means for repeatedly storing energy in and releasing energy from the smoothing reactor and turning on and off the first and second switching devices so that electric power is transferred and received between the first and second smoothing capacitors, the bidirectional DC-DC converter comprising:
 a resonant reactor;
 a storage circuit for storing part of the energy released from the smoothing reactor and/or the resonant reactor in a period in which the smoothing reactor releases the energy it stored; and
 a third switching device by which part of the energy stored in the storage circuit is released into the resonant reactor;
 wherein the control means operates to turn the third switching device on and off complementarily to the first switching device when the electric power is supplied to the second power supply from the first power supply, and operates to turn the third switching device on and off complementarily to the second switching device when the electric power is supplied to the first power supply from the second power supply so that an output capacitance of the first and second switching device and/or charges stored in a buffer capacitor connected in parallel to the first and second switching device are drawn immediately before the first and second switching device is turned on using the energy stored in the resonant reactor.

2. The bidirectional DC-DC converter according to claim 1, wherein:
 the resonant reactor stores energy by using current for storing energy in and/or discharging energy from the smoothing reactor;
 the energy stored in the resonant reactor and/or the energy of the smoothing reactor is transferred to a resonant capacitor in the storage circuit; and
 the energy stored in the resonant capacitor is stored in the resonant reactor through the third switching device.

3. The bidirectional DC-DC converter according to claim 1, wherein the polarity of voltage applied to the resonant reactor in the period in which the smoothing reactor releases the energy it stored is unchanged, regardless of the direction of the power transfer between the first and second power supplies.

4. The bidirectional DC-DC converter according to claim 2, wherein the resonant capacitor in the storage circuit is connected in series to the third switching device.

5. The bidirectional DC-DC converter according to claim 1, wherein a diode and/or a parasitic diode is connected in parallel to each of the first to third switching devices in a back-to-back configuration.

6. The bidirectional DC-DC converter according to claim 5, wherein the control means supplies a turn-on signal to the first to third switching devices connected in parallel to the diode and/or the parasitic diode while the diode and/or the parasitic diode is turned on.

7. The bidirectional DC-DC converter according to claim 1, wherein the buffer capacitor is connected in parallel to the first, second, and/or third switching device.

8. The bidirectional DC-DC converter according to claim 1, wherein a first resonant reactor and a second resonant reactor are provided as the resonant reactor, which are respectively connected in series to the first switching device and the second switching device.

9. The bidirectional DC-DC converter according to claim 1, wherein a first resonant reactor and a second resonant reactor are provided as the resonant reactor, which are respectively connected in series to the first switching device and the second switching device and magnetically coupled with each other.

10. A bidirectional DC-DC converter including a vertical arm formed by interconnecting a terminal of a first switching device and a terminal of a second switching device, a smoothing reactor, one end of which is connected to a connection point between the first and second switching devices, a first smoothing capacitor connected between the other end of the smoothing reactor and the other end of the first switching device and also connected in parallel to a first power supply, a second smoothing capacitor connected between the other end of the smoothing reactor and the other end of the second switching device or between both ends of the vertical arm and also connected in parallel to a second power supply, the bidirectional DC-DC converter comprising:
 a resonant reactor connected in series to at least either of the first and second switching devices;
 a series connection body including a third switching device and a resonant capacitor;
 a resonant circuit formed by including the resonant reactor and the resonant capacitor through the third switching device, and
 a current sensor for detecting a direction of a current flowing in the smoothing reactor,
 wherein the control means operates to turn the third switching device on and off complementarily to the first switching device when the direction of the current flowing in the smoothing reactor is in one direction so that the electric power is supplied to the second power supply from the first power supply, and operates to turn the third switching device on and off complementarily to the second switching device when the direction of the current flowing in the smoothing reactor is in a direction opposite to said one direction so that the electric power is supplied to the first power supply from the second power supply.

11. A bidirectional DC-DC converter including a vertical arm formed by interconnecting a terminal of a first switching device and a terminal of a second switching device, a smoothing reactor, one end of which is connected to a connection point between the first and second switching devices, and a first smoothing reactor connected between the other end of the smoothing reactor and the other end of the first switching device and also connected in parallel to a first power supply, and a second smoothing reactor connected between both ends of the vertical arm and also connected in parallel to a second power supply, wherein the voltage of the second power supply is higher than a voltage of the first power supply, the bidirectional DC-DC converter comprising:

a resonant reactor connected in series to at least either of the first and second switching devices;

a series connection body including a third switching device and a resonant capacitor;

a resonant circuit formed by including the resonant reactor and the resonant capacitor through the third switching device, and a current sensor for detecting a direction of a current flowing in the smoothing reactor, wherein the control means operates to turn the third switching device on and off complementarily to the first switching device when the direction of the current flowing in the smoothing reactor is in one direction so that the electric power is supplied to the second power supply from the first power supply, and operates to turn the third switching device on and off complementarily to the second switching device when the direction of the current flowing in the smoothing reactor is in a direction opposite to said one direction so that the electric power is supplied to the first power supply from the second power supply.

12. A bidirectional DC-DC converter including a vertical arm formed by interconnecting terminal of a first switching device and a terminal of a second switching device, a smoothing reactor, one end of which is connected to a connection point between the first and second switching devices, a first smoothing capacitor connected between the other end of the smoothing reactor and the other end of the first switching device and also connected in parallel to a first power supply, a second smoothing capacitor connected between the other end of the smoothing reactor and the other end of the second switching device and also connected in parallel to a second power supply, the bidirectional DC-DC converter comprising:

a resonant reactor connected in series to at least either of the first and second switching devices;

a series connection body including a third switching device and a resonant capacitor;

a resonant circuit formed by including the resonant reactor and the resonant capacitor through the third switching device, and a current sensor for detecting a direction of a current flowing in the smoothing reactor, wherein the control means operates to turn the third switching device on and off complementarily to the first switching device when the direction of the current flowing in the smoothing reactor is in one direction so that the electric power is supplied to the second power supply from the first power supply, and operates to turn the third switching device on and off complementarily to the second switching device when the direction of the current flowing in the smoothing reactor is in a direction opposite to said one direction so that the electric power is supplied to the first power supply from the second power supply.

13. The bidirectional DC-DC converter according to claim 10, wherein the resonant circuit includes the first and/or second smoothing reactors.

14. The bidirectional DC-DC converter according to claim 10, wherein a first resonant reactor and a second resonant reactor are provided as the resonant reactor, which are respectively connected in series to the first switching device and the second switching device.

15. The bidirectional DC-DC converter according to claim 10, wherein a diode and/or a parasitic diode is connected in parallel to each of the first to third switching devices in a back-to-back configuration.

16. The bidirectional DC-DC converter according to claim 10, wherein a buffer capacitor is connected in parallel to the first, second, or third switching device.

17. The bidirectional DC-DC converter according to claim 15, wherein the control means supplies a turn-on signal to the first to third switching devices connected in parallel to the diode and/or the parasitic diode while the diode and/or the parasitic diode is turned on.

18. The bidirectional DC-DC converter according to claim 10, wherein the control means provides a period in which both the first and third switching devices or both the second and third switching devices are turned off together and turning them on and off complementarily.

19. The bidirectional DC-DC converter according to claim 10, wherein a first resonant reactor and a second resonant reactor are provided as the resonant reactor, which are respectively connected in series to the first switching device and the second switching device and magnetically coupled with each other.

20. The bidirectional DC-DC converter according to claim 10, further comprising a control means having a current sensor that detects a direction of a current flowing in the smoothing reactor, the control means providing a period in which both the third switching device and the first or second switching device are turned off together and complementarily turning on and off them, either of the first and second switching devices being selected according to the flow direction of the current.

* * * * *